(12) United States Patent
Phillips et al.

(10) Patent No.: US 8,940,430 B2
(45) Date of Patent: Jan. 27, 2015

(54) METALLIC ZINC-BASED CURRENT COLLECTOR

(75) Inventors: Jeffrey Phillips, La Jolla, CA (US); Samaresh Mohanta, San Diego, CA (US); Zhen Gang Fan, Shenzhen (CN); Ru Jun Ma, Mian Yang (CN); Feng Feng, San Diego, CA (US); Lou Uzel, San Diego, CA (US); Chi Yau, Escondido, CA (US); Jason Zhao, Suisun (CA); Zeiad M. Muntasser, San Diego, CA (US)

(73) Assignee: PowerGenix Systems, Inc., La Jolla, CA (US)

( * ) Notice: Subject to any disclaimer, the term of this patent is extended or adjusted under 35 U.S.C. 154(b) by 0 days.

(21) Appl. No.: 12/523,529

(22) PCT Filed: Feb. 8, 2008
(Under 37 CFR 1.47)

(86) PCT No.: PCT/US2008/053500
§ 371 (c)(1),
(2), (4) Date: Dec. 29, 2009

(87) PCT Pub. No.: WO2008/100831
PCT Pub. Date: Aug. 21, 2008

(65) Prior Publication Data
US 2010/0092857 A1    Apr. 15, 2010

Related U.S. Application Data

(60) Provisional application No. 60/936,587, filed on Jun. 20, 2007.

(30) Foreign Application Priority Data

Feb. 12, 2007  (CN) .......................... 2007 1 0073332

(51) Int. Cl.
H01M 4/48     (2010.01)
H01M 4/02     (2006.01)
(Continued)

(52) U.S. Cl.
USPC ............ 429/164; 429/209; 429/231; 429/247

(58) Field of Classification Search
None
See application file for complete search history.

(56) References Cited

U.S. PATENT DOCUMENTS 3,897,266 A * 7/1975 Devitt et al. ................. 429/57
5,464,709 A * 11/1995 Getz et al. ................... 429/229
(Continued)

FOREIGN PATENT DOCUMENTS

EP        0 732 761      9/1996
JP        01-319261      12/1989
(Continued)

OTHER PUBLICATIONS

International Search Report and Written Opinion dated Jul. 14, 2008 from PCT/US2008/053500.
(Continued)

*Primary Examiner* — Alix Echelmeyer
(74) *Attorney, Agent, or Firm* — Weaver Austin Villeneuve & Sampson LLP

(57) ABSTRACT

A nickel zinc battery cell includes a metallic zinc-based current collection substrate as a part of the negative electrode. The metallic zinc-based current collector may be made of or be coated with a zinc metal or zinc alloy material and may be a foil, perforated, or expanded material. Battery cells incorporating the zinc-based current collector exhibit good cycle lifetime and initial charge performance.

23 Claims, 11 Drawing Sheets

(51) Int. Cl.
*H01M 2/02* (2006.01)
*H01M 6/10* (2006.01)

(56) References Cited

U.S. PATENT DOCUMENTS

| | | | |
|---|---|---|---|
| 6,495,289 B1 | 12/2002 | Kawakami | |
| 6,558,848 B1* | 5/2003 | Kobayashi et al. | 429/241 |
| 6,586,139 B1* | 7/2003 | Watanabe et al. | 429/304 |
| 2003/0190528 A1 | 10/2003 | Saidi | |
| 2005/0064292 A1* | 3/2005 | Phillips et al. | 429/246 |
| 2005/0112464 A1* | 5/2005 | Phillips | 429/231 |
| 2005/0214648 A1* | 9/2005 | Boulton et al. | 429/234 |
| 2006/0172197 A1* | 8/2006 | Zhu | 429/232 |
| 2006/0204839 A1* | 9/2006 | Richards et al. | 429/137 |
| 2006/0207084 A1 | 9/2006 | Phillips | |

FOREIGN PATENT DOCUMENTS

| | | |
|---|---|---|
| JP | 05-135778 | 6/1993 |
| JP | H05-135776 | 6/1993 |
| JP | 05-266881 | 10/1993 |
| JP | 07-65835 | 3/1995 |
| JP | H8-321310 A | 12/1996 |
| WO | WO/2005/004254 | 1/2005 |
| WO | WO 2005/020353 | 3/2005 |
| WO | WO 2008/100831 | 8/2008 |

OTHER PUBLICATIONS

Chinese Office Action, dated Apr. 26, 2011, issued in Application No. 200880007975.X.
European Search Report, dated Oct. 6, 2011, issued in Application No. 08729456.7.
Chinese Office Action, dated Dec. 16, 2011, issued in Application No. 200880007975.X.
CN 3rd Office Action dated May 15, 2012, issued in Application No. 200880007975.X.
JP Office Action dated Mar. 12, 2013 in JP Application No. 2009-549277.
CN 4th Office Action dated Dec. 14, 2012, issued in Application No. 00880007975.X.
CN Office Action dated Jul. 3, 2013 in CN Application No. 200880007975.X.
3$^{rd}$ Party Submission dated Oct. 24, 2013 submitted to the Japanese Patent Office in JP Application No. 2009-549277.
Korean Office action mailed Apr. 30, 2014 in KR Application No. 2009-7016142.
Japanese Office action mailed Jan. 21, 2014 in JP Application No. 2009-549277.

* cited by examiner

METALLIC ZINC-BASED CURRENT COLLECTOR

RELATED APPLICATIONS

This application claims priority to U.S. Provisional Patent Application No. 60/936,587, filed Jun. 20, 2007, titled "METALLIC ZINC BASED CURRENT COLLECTOR," the disclosure of which is incorporated herein by reference in its entirety and for all purposes. This application also claims priority to Chinese Application No. 200710073332.2, filed Feb. 12, 2007, titled "NEGATIVE PLATE OF ZINC-NICKEL BATTERY," the disclosure of which is incorporated herein by reference in its entirety and for all purposes.

FIELD OF THE INVENTION

The present invention relates to rechargeable batteries and, more particularly to nickel zinc rechargeable battery cells. Even more specifically, this invention pertains to composition and structure of current collectors for negative electrodes in nickel zinc battery cells.

BACKGROUND OF THE INVENTION

A battery cell employs positive electrode, a negative electrode and an electrolyte, sometimes configured as alternating electrode and electrolyte layers. Each electrode may include a current collection substrate and one or more electrochemically active layers. Among the considerations for the current collector design are the following: (a) high electrically conductivity; (b) resistance to corrosion by the electrolyte used; (c) resistance to electrochemical reactions so as not to be consumed too quickly; (d) mechanical strength and flexibility allowing it withstand manufacturing operations (e.g., pasting and rolling); (e) low cost, including material cost and manufacturing; and (f) a surface structure providing good physical contact, or "connectivity," to the electrochemically active layers (e.g., the material should not form a passivating film so as to prevent the good physical contact and should adhere well to the electrochemically active layers). It is not critical that any one or more of these features be met. For example, a current collector may be outstanding in one or more categories and yet be sub-standard in others. Thus, a material having disadvantages in one aspect may still be used if the disadvantages may be overcome by the overall battery design.

Lead-acid and cadmium-nickel batteries are used widely. Although the lead-acid and cadmium-nickel batteries contain heavy metals and toxic substances such as lead and cadmium, they have stable properties, reliable application and high performance to price ratio. Thus they have been the predominant types of secondary batteries and are used in communication, electric power, automobiles, trains, aviation and aerospace industries, UPS power supplies, household electric appliances, motor tools, motor toys, etc.

A zinc-nickel battery has excellent properties, such as relatively higher over-potential of hydrogen evolution, good reversibility, high energy density, high average voltage (1.65 V), and relatively homogeneous anode dissolution. Even more important, zinc metal is environment-friendly as the use of which does not cause pollution to the environment. Yet zinc-nickel secondary batteries have not been widely commercialized. Zinc metal is amphoteric, very active, and dissolves in both acid and base while producing hydrogen. A zinc metal current collector in an alkaline electrolyte may deform, corrode and deactivate. During charging of a rechargeable nickel-zinc battery, zinc dendritic crystals may generate and grow, causing short circuits when they penetrate separators between the positive and negative electrodes. Thus current collection substrate design has avoided the use of zinc metal as the current collection substrate.

Common materials currently used for zinc negative electrode current collectors include copper and brass. The copper or brass may be punched strips, meshes, foams and the like. The electrodes are formed by adhering an active substance containing zinc element, such as ZnO, Zn or calcium zincate, to one side or both sides of the copper or brass. The contact of the zinc active material with these substrates may accelerate zinc corrosion by promoting hydrogen evolution. This zinc corrosion causes "gas swelling," creepage and leakage, capacity fading, short cycle lifetime, unsteadiness and unreliability of the zinc-nickel battery.

It is observed that as nickel zinc batteries discharge and recharge over many cycles, the battery capacity reduces. For many applications, a battery is considered dead if the battery capacity after a full recharge is less than 80% of the rated capacity. It is desirable to complete a high number of cycles before a battery dies and avoid the disadvantages of zinc corrosion with a current collector design that meets the design and manufacturing considerations.

SUMMARY OF THE INVENTION

The present invention pertains to a cylindrical nickel zinc battery cell having a metallic zinc-based substrate current collector as a part of the negative electrode, a positive electrode layer including nickel, a separator layer to separate the positive and negative electrode layers, and an electrolyte. The metallic zinc-based current collector may be made of a zinc metal or zinc alloy material comprising greater than 50% atomic zinc, preferably 80-100% atomic zinc, more preferably 95-100% atomic zinc, or even more preferably greater than about 99% atomic zinc. In certain embodiments, the metallic zinc-based substrate current collector contains 98.5 to 99.95% atomic zinc; specific examples including 98.7% atomic zinc, 99.5% atomic zinc, and 99.95% atomic zinc. In one embodiment, the material is a zinc alloy comprising 95-100% atomic zinc and the rest bismuth and lead. In some embodiments, the metallic zinc-based current collector may be a zinc-rich brass alloy.

The metallic zinc-based substrate current collector may be a metallic sheet, plate, or foil having a thickness of, e.g., about 2-5 mils. The metallic sheet or plate may be perforated or not. It may be perforated with circles or ovals or rectangles or other geometric shapes. If may also be patterned to provide a rough surface so as to make better physical contact with the electrochemically active layer. In certain embodiments, the zinc current collector may be expanded metal having a thickness of about 2-20 mils. The current collector may also be made of a foam material having a thickness of, e.g., between about 15 and 60 mils.

As an alternative to using zinc alloy materials as the entire substrate current collector, the metallic zinc-based substrate current collector may be a zinc coated structure in which a non-zinc core metal is plated or clad with a zinc-based metal (e.g., metallic zinc or zinc alloy). The core metal may be, e.g., steel, copper, tin, or conventional brass. It may be provided in the form of, e.g., a continuous sheet, perforated sheet, expanded metal, plate, mesh or foam. Zinc metal may be plated or clad onto a sheet of the core metal. In certain embodiments, the zinc coating may include a small amount of bismuth and/or lead. If zinc-based metal is clad onto the core metal, a hot press method or any other conventional cladding method may be used. A current collector having zinc-based metal plating or clad may be 2-10 mils thick, preferably 2-5 mils thick.

In another aspect, the present invention pertains to a negative electrode of a nickel-zinc battery cell. The negative electrode includes a metallic zinc-based substrate current collector and a negative electrochemically active layer adhering to the current collector. The current collector may be a metal zinc plate, metal zinc alloy plate or a metal zinc mesh. The metal zinc plate may be perforated. In specific embodiments, the zinc-based substrate used in the negative electrode may have one or more features as described above.

Because zinc metal costs less than copper or brass, batteries manufactured with zinc-based substrate current collectors may cost less than batteries manufactured with copper or brass current collectors. The lower price increases a performance-to-price ratio for the nickel-zinc battery. Batteries made with a substrate current collector of the present invention has better low to medium and better large-current discharge performance, cycle lifetime, and storage performance than batteries made with a copper or brass substrate current collector.

These and other features and advantages of the present invention are discussed below with reference to the drawings.

DETAILED DESCRIPTION OF THE PREFERRED EMBODIMENTS

Introduction

In the following detailed description of the present invention, numerous specific embodiments are set forth in order to provide a thorough understanding of the invention. However, as will be apparent to those skilled in the art, the present invention may be practiced without these specific details or by using alternate elements or processes, employing the spirit and scope of the invention. In other instances well-known processes, procedures and components have not been described in detail so as not to unnecessarily obscure aspects of the present invention.

The present invention pertains to a cylindrical nickel zinc battery cell having a metallic zinc-based substrate current collector as a part of the negative electrode, a positive electrode layer comprising nickel, a separator layer to separate the positive and negative electrode layers, and an electrolyte.

As discussed above, considerations for current collector design include corrosion resistance and electrochemical reaction resistance. Typically, current collectors are not made of the same material as the electrochemically active layer so that the current collector will not fail due to consumption by participating in the electrochemical reaction. Therefore, using zinc-based metal as the material for a current collector runs counter to conventional wisdom. However, it has been unexpectedly discovered that using zinc-based metal as a current collector may be successful, even when used in medium and large rate discharge applications. When used in this way, any disadvantages of a zinc-based current collector are outweighed by the advantages. Some of the advantages include lower cost, equal or better performance of cycle lifetime, discharge performance, and storage performance.

As described herein, a current collector may be designed that reduces or eliminates the disadvantages inherent in a zinc-based current collector. In order to frame the context of this invention, the general battery cell structure and discharge is described below.

General Structure of a Battery Cell

Figure 1B:
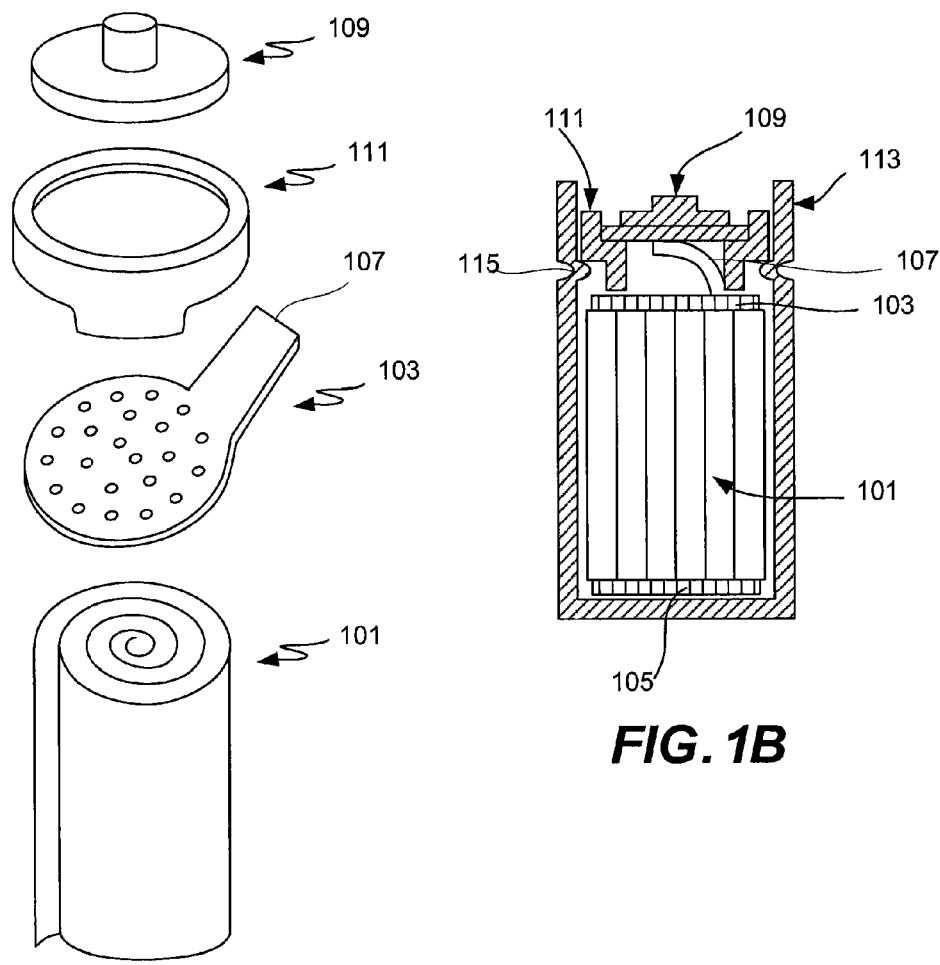
FIG. 1B is a graphical representation of a cylindrical power cell.
Figure 1A:
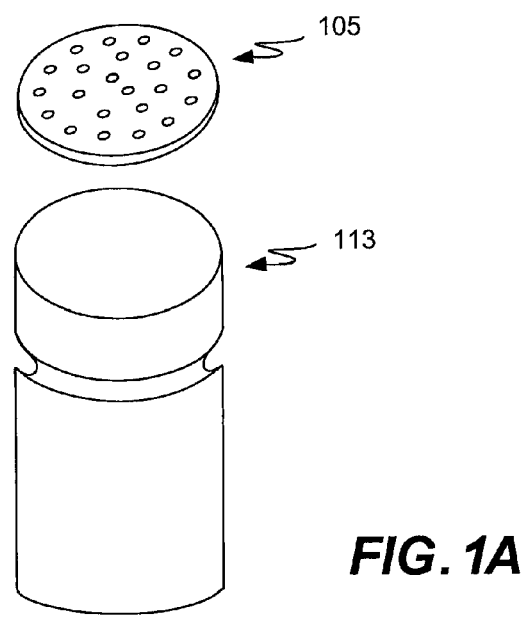
FIG. 1A is an exploded view of a graphical representation of a cylindrical power cell.

FIGS. 1A and 1B are graphical representations of the main components of a cylindrical power cell according to an embodiment of the invention, with FIG. 1A showing an exploded view of the cell. Alternating electrode and electrolyte layers are provided in a cylindrical assembly 101 (also called a "jellyroll"). The cylindrical assembly or jellyroll 101 is positioned inside a can 113 or other containment vessel. A negative collector disk 103 and a positive collector disk 105 are attached to opposite ends of cylindrical assembly 101. The negative and positive collector disks function as internal terminals, with the negative collector disk electrically connected to the negative electrode and the positive collector disk electrically connected to the positive electrode. A cap 109 and the can 113 serve as external terminals. In the depicted embodiment, negative collector disk 103 includes a tab 107 for connecting the negative collector disk 103 to cap 109. Positive collector disk 105 is welded or otherwise electrically connected to can 113. In other embodiments, the negative collector disk connects to the can and the positive collector disk connects to the cap.

The negative and positive collector disks 103 and 105 are shown with perforations, which may be employed to facilitate bonding to the jellyroll and/or passage of electrolyte from one portion of a cell to another. In other embodiments, the disks may employ slots (radial or peripheral), grooves, or other structures to facilitate bonding and/or electrolyte distribution.

A flexible gasket 111 rests on a circumferential bead 115 provided along the perimeter in the upper portion of can 113, proximate to the cap 109. The gasket 111 serves to electrically isolate cap 109 from can 113. In certain embodiments, the bead 115 on which gasket 111 rests is coated with a polymer coating. The gasket may be any material that electrically isolates the cap from the can. Preferably the material does not appreciably distort at high temperatures; one such material is nylon. In other embodiments, it may be desirable to use a relatively hydrophobic material to reduce the driving force that causes the alkaline electrolyte to creep and ultimately leak from the cell at seams or other available egress points. An example of a less wettable material is polypropylene.

After the can or other containment vessel is filled with electrolyte, the vessel is sealed to isolate the electrodes and electrolyte from the environment as shown in FIG. 1B. The gasket is typically sealed by a crimping process. In certain embodiments, a sealing agent is used to prevent leakage. Examples of suitable sealing agents include bituminous sealing agents, tar and VERSAMID® available from Cognis of Cincinnati, Ohio.

In certain embodiments, the cell is configured to operate in an electrolyte "starved" condition. Such cells have relatively low quantities electrolyte in relation to the amount of active electrode material. They can be easily distinguished from flooded cells, which have free liquid electrolyte in interior regions of the cell. As discussed in U.S. patent application Ser. No. 11/116,113, filed Apr. 26, 2005, titled "Nickel Zinc Battery Design," hereby incorporated by reference, it may be desirable to operate a cell at starved conditions for a variety of reasons. A starved cell is generally understood to be one in which the total void volume within the cell electrode stack is not fully occupied by electrolyte. In a typical example, the void volume of a starved cell after electrolyte fill may be at least about 10% of the total void volume before fill.

The battery cells of this invention can have any of a number of different shapes and sizes. For example, cylindrical cells of this invention may have the diameter and length of conventional AAA cells, AA cells, A cells, C cells, etc. Custom cell designs are appropriate in some applications. In a specific embodiment, the cell size is a sub-C cell size of diameter 22 mm and length 43 mm. Note that the present invention also may be employed in relatively small prismatic cell formats, as well as various larger format cells employed for various non-portable applications. Often the profile of a battery pack for, e.g., a power tool or lawn tool will dictate the size and shape of the battery cells. This invention also pertains to battery packs including one or more nickel zinc battery cells of this invention and appropriate casing, contacts, and conductive lines to permit charge and discharge in an electronic device.

Negative Electrode Active Material Composition

Generally the negative electrode includes one or more electroactive sources of zinc or zincate ions optionally in combination with one or more additional materials such as conductivity enhancing materials, corrosion inhibitors, wetting agents, etc. as described below. When the electrode is fabricated it will be characterized by certain physical, chemical, and morphological features such as coulombic capacity, chemical composition of the active zinc, porosity, tortuosity, etc.

The electrochemically active zinc source may comprise one or more of the following components: zinc oxide, calcium zincate, zinc metal, and various zinc alloys. Any of these materials may be provided during fabrication and/or be created during normal cell cycling. As a particular example, consider calcium zincate, which may be produced from a paste or slurry containing, e.g., calcium oxide and zinc oxide.

If a zinc alloy is employed, it may in certain embodiments include bismuth and/or indium. In certain embodiments, it may include up to about 20 parts per million lead. A commercially available source of zinc alloy meeting this composition requirement is PG101 provided by Noranda Corporation of Canada.

The zinc active material may exist in the form of a powder, a granular composition, etc. Preferably, each of the components employed in a zinc electrode paste formulation has a relatively small particle size. This is to reduce the likelihood that a particle may penetrate or otherwise damage the separator between the positive and negative electrodes.

Considering electrochemically active zinc components in particular (and other particulate electrode components as well), such components preferably have a particle size that is no greater than about 40 or 50 micrometers. In certain embodiments, the material may be characterized as having no more than about 1% of its particles with a principal dimension (e.g., diameter or major axis) of greater than about 50 micrometers. Such compositions can be produced by, for example, sieving or otherwise treating the zinc particles to remove larger particles. Note that the particle size regimes recited here apply to zinc oxides and zinc alloys as well as zinc metal powders.

In addition to the electrochemically active zinc component(s), the negative electrode may include one or more additional materials that facilitate or otherwise impact certain processes within the electrode such as ion transport, electron transport (e.g., enhance conductivity), wetting, porosity, structural integrity (e.g., binding), gassing, active material solubility, barrier properties (e.g., reducing the amount of zinc leaving the electrode), corrosion inhibition etc.

For example, in some embodiments, the negative electrode includes an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. It may facilitate recombination of hydrogen and oxygen. Indium oxide may be present in a concentration of between about 0.05 and 1% by weight of a dry negative electrode formulation. Aluminum oxide may be provided in a concentration of between about 1 and 5% by weight of a dry negative electrode formulation.

In some embodiments, a "nano-size" indium compound (e.g., indium sulfate or indium oxide) is employed. In such embodiments, the indium compounds have a particle size averaging not more than about 10 nanometers. Typically, indium is present in dry negative electrode formulations at about 0.05% by weight. It is believed that a problem that can sometimes arise is to have locally rich indium concentration regions within the negative electrode. By employing very small indium particles that may be evenly dispersed throughout the negative electrode, the danger of indium rich alloy regions in the electrode is reduced.

In certain embodiments, one or more additives may be included to improve corrosion resistance of the zinc electroactive material and thereby facilitate long shelf life. The shelf life can be critical to the commercial success or failure of a battery cell. Recognizing that batteries are intrinsically chemically unstable devices, steps should be taken to preserve battery components, including the negative electrode, in their chemically useful form. When electrode materials corrode or otherwise degrade to a significant extent over weeks or months without use, their value becomes limited by short shelf life.

Examples of corrosion inhibiting additives include cations of indium, bismuth, lead, tin, calcium, etc. Generally, these may be present in a negative electrode in the form of salts (e.g., sulfates, fluorides, etc.) at concentrations of up to about 25% by weight of a dry negative electrode formulation, typically up to about 10% by weight. In certain embodiments, organic materials may be included in the electrode formulation to inhibit corrosion of the zinc electroactive material. Examples of such inhibitors include surfactants such as commercially available Triton and RS600 surfactants.

Specific examples of anions that may be included to reduce the solubility of zinc in the electrolyte include phosphate, fluoride, borate, zincate, silicate, stearate, etc. Generally, these anions may be present in a negative electrode in concentrations of up to about 5% by weight of a dry negative electrode formulation. It is believed that at least certain of these anions go into solution during cell cycling and there they reduce the solubility of zinc. Examples of electrode formulations including these materials are included in the following patents and patent applications, each of which is incorporated herein by reference for all purposes: U.S. Pat. No. 6,797,433, issued Sep. 28, 2004, titled, "Negative Electrode Formulation for a Low Toxicity Zinc Electrode Having Additives with Redox Potentials Negative to Zinc Potential," by Jeffrey Phillips; U.S. Pat. No. 6,835,499, issued Dec. 28, 2004, titled, "Negative Electrode Formulation for a Low Toxicity Zinc Electrode Having Additives with Redox Potentials Positive to Zinc Potential," by Jeffrey Phillips; U.S. Pat. No. 6,818,350, issued Nov. 16, 2004, titled, "Alkaline Cells Having Low Toxicity Rechargeable Zinc Electrodes," by Jeffrey Phillips; and PCT/NZ02/00036 (publication no. WO 02/075830) filed Mar. 15, 2002 by Hall et al.

Examples of materials that may be added to the negative electrode to improve wetting include titanium oxides, alumina, silica, alumina and silica together, etc. Generally, these materials are provided in concentrations of up to about 10% by weight of a dry negative electrode formulation. A further discussion of such materials may be found in U.S. Pat. No. 6,811,926, issued Nov. 2, 2004, titled, "Formulation of Zinc Negative Electrode for Rechargeable Cells Having an Alkaline Electrolyte," by Jeffrey Phillips, which is incorporated herein by reference for all purposes.

Examples of materials that may be added to the negative electrode to improve electronic conductance include various electrode compatible materials having high intrinsic electronic conductivity. Examples include titanium oxides, etc. Generally, these materials are provided in concentrations of up to about 10% by weight of a dry negative electrode formulation. The exact concentration will depend, of course, on the properties of chosen additive.

Various organic materials may be added to the negative electrode for the purpose of binding, dispersion, and/or as surrogates for separators. Examples include hydroxylethyl cellulose (HEC), carboxymethyl cellulose (CMC), the free acid form of carboxymethyl cellulose (HCMC), polytetrafluoroethylene (PTFE), polystyrene sulfonate (PSS), polyvinyl alcohol (PVA), nopcosperse dispersants (available from San Nopco Ltd. of Kyoto Japan), etc.

In a specific example, PSS and PVA are used to coat the negative electrode to provide wetting or other separator-like properties. In certain embodiments, when using a separator-like coating for the electrode, the zinc-nickel cell may employ a single layer separator and in some embodiments, no independent separator at all.

In certain embodiments, polymeric materials such as PSS and PVA may be mixed with the paste formation (as opposed to coating) for the purpose of burying sharp or large particles in the electrode that might otherwise pose a danger to the separator.

When defining an electrode composition herein, it is generally understood as being applicable to the composition as produced at the time of fabrication (e.g., the composition of a paste, slurry, or dry fabrication formulation), as well as compositions that might result during or after formation cycling or during or after one or more charge-discharge cycles while the cell is in use such as while powering a portable tool.

Various negative electrode compositions within the scope of this invention are described in the following documents, each of which is incorporated herein by reference: PCT Publication No. WO 02/39517 (J. Phillips), PCT Publication No. WO 02/039520 (J. Phillips), PCT Publication No. WO 02/39521, PCT Publication No. WO 02/039534 and (J. Phillips), US Patent Publication No. 2002182501. Negative electrode additives in the above references include, for example, silica and fluorides of various alkaline earth metals, transition metals, heavy metals, and noble metals. In one example, an electrochemically active material may include zinc oxide 50%, calcium zincate 20%, barium oxide 3.0%, bismuth oxide 1.5%, indium oxide 1.0%, lead oxide 1.5%, zinc 3.0%, cadmium 1.0%, and a water-based binder.

It should be noted that while a number of materials may be added to the negative electrode to impart particular properties, some of those materials or properties may be introduced via battery components other than the negative electrode. For example, certain materials for reducing the solubility of zinc in the electrolyte may be provided in the electrolyte or separator (with or without also being provided to the negative electrode). Examples of such materials include phosphate, fluoride, borate, zincate, silicate, stearate. Other electrode additives identified above that might be provided in the electrolyte and/or separator include surfactants, ions of indium, bismuth, lead, tin, calcium, etc.

U.S. patent application Ser. No. 10/921,062 (J. Phillips), filed Aug. 17, 2004, hereby incorporated by reference, describes a method of manufacturing a zinc negative electrode of the type that may be employed in the present invention.

Negative Electronic Conduction Pathway

The negative electronic pathway is comprised of the battery components that carry electrons between the negative electrode and the negative terminal during charge and discharge. One of these components is a carrier or current collection substrate on which the negative electrode material is formed and supported. This is a subject of the present invention. In a cylindrical cell design, the substrate is typically provided within a spirally wound sandwich structure that includes the negative electrode material, a cell separator and the positive electrode components (including the electrode itself and a positive current collection substrate). As indicated, this structure is often referred to as a jellyroll. Other components of the negative electronic pathway are depicted in FIG. 1A. Typically, though not necessarily, these include a current collector disk (often provided with a conductive tab) and a negative cell terminal. In the depicted embodiment, the disk is directly connected to the negative current collection substrate and the cell terminal is directly attached to the current collector disk (often via the conductive tab). In a cylindrical cell design, the negative cell terminal is usually either a cap or a can.

Each of the components of the negative electronic conduction pathway may be characterized by its composition, electrical properties, chemical properties, geometric and structural properties, etc. For example, in certain embodiments, each element of the pathway has the same composition (e.g., zinc or zinc coated copper). In other embodiments, at least two of the elements have different compositions.

Current Collection Substrate

As indicated, an element of the conductive pathway that is the subject of this application is the carrier or substrate for the negative electrode, which also serves as a current collector. Among the criteria to consider when choosing a material and structure for the substrate are electrochemically compatible with the negative electrode materials, cost, ease of coating (with the negative electrode material), suppression of hydrogen evolution, and ability to facilitate electron transport between the electrochemically active electrode material and the current collector.

As explained, the current collection substrate can be provided in various structural forms including perforated metal sheets, expanded metals, metal foams, etc. In a specific embodiment, the substrate is a perforated sheet or an expanded metal made from a zinc-based material such as zinc coated copper or zinc coated copper alloy. In certain embodiments, the substrate is a perforated sheet having a thickness between about 2 and 5 mils. In certain embodiments, the substrate is an expanded metal having a thickness between about 2 and 20 mils. In other embodiments, the substrate is a metal foam having a thickness of between about 15 and 60 mils. In a specific embodiment, the carrier is about 3-4 mils thick perforated zinc coated copper. A specific range for the thickness of the negative electrode, including the carrier metal and negative electrode material is about 10 to 30 mils.

Other Components of the Pathway

Other components of the negative pathway, such as a negative current collector disk and cap, may be made from any of the base metals identified above for the current collection substrate. The base material chosen for the disk and/or cap should be highly conductive and inhibit the evolution of hydrogen, etc. In certain embodiments, one or both of the disk and the cap employs zinc or a zinc alloy as a base metal. In certain embodiments, the current collector disk and/or the cap is a copper or copper alloy coated with zinc or an alloy of zinc containing, e.g., tin, silver, indium, lead, or a combination thereof. It may be desirable to pre-weld the current collector disk and jelly roll or employ a jelly roll that is an integral part of the current collector disk and tab that could be directly welded to the top. Such embodiments may find particular value in relatively low rate applications. These embodiments are particularly useful when the collector disk contains zinc. The jelly roll may include a tab welded to one side of the negative electrode to facilitate contact with the collector disk.

It has been found that regular vent caps without proper anti-corrosion plating (e.g., tin, lead, silver, zinc, indium, etc.) can cause zinc to corrode during storage, resulting in leakage, gassing, and reduced shelf life. Note that if it is the can, rather than the cap, that is used as the negative terminal, then the can may be constructed from the materials identified above.

In some cases, the entire negative electronic pathway (including the terminal and one or more current collection elements) is made from the same material, e.g., zinc or copper coated with zinc. In a specific embodiment, the entire electronic pathway from the negative electrode to the negative terminal (current collection substrate, current collector disk, tab, and cap) is zinc plated copper or brass.

Some details of the structure of a vent cap and current collector disk, as well as the carrier substrate itself, are found in the following patent applications which are incorporated herein by reference for all purposes: PCT/US2006/015807 filed Apr. 25, 2006 and PCT/US2004/026859 filed Aug. 17, 2004 (publication WO 2005/020353 A3).

The Positive Electrode

The positive electrode generally includes an electrochemically active nickel oxide or hydroxide and one or more additives to facilitate manufacturing, electron transport, wetting, mechanical properties, etc. For example, a positive electrode formulation may include at least an electrochemically active nickel oxide or hydroxide (e.g., nickel hydroxide ($Ni(OH)_2$)), zinc oxide, cobalt oxide (CoO), cobalt metal, nickel metal, and a flow control agent such as carboxymethyl cellulose (CMC). Note that the metallic nickel and cobalt may be chemically pure or alloys. In certain embodiments, the positive electrode has a composition similar to that employed to fabricate the nickel electrode in a conventional nickel cadmium battery, although there may be some important optimizations for the nickel zinc battery system.

A nickel foam matrix is preferably used to support the electroactive nickel (e.g., $Ni(OH)_2$) electrode material. In one example, commercially available nickel foam by Inco, Ltd. may be used. The diffusion path to the $Ni(OH)_2$ (or other electrochemically active material) through the nickel foam should be short for applications requiring high discharge rates. At high rates, the time it takes ions to penetrate the nickel foam is important. The width of the positive electrode, comprising nickel foam filled with the $Ni(OH)_2$ (or other electrochemically active material) and other electrode materials, should be optimized so that the nickel foam provides sufficient void space for the $Ni(OH)_2$ material while keeping the diffusion path of the ions to the $Ni(OH)_2$ through the foam short. The foam substrate thickness may be may be between 15 and 60 mils. In a preferred embodiment, the thickness of the positive electrode, comprising nickel foam filled with the electrochemically active and other electrode materials, ranges from about 16-24 mils. In a particularly preferred embodiment, positive electrode is about 20 mils thick.

The density of the nickel foam should be optimized to ensure that the electrochemically active material uniformly penetrates the void space of the foam. In a preferred embodiment, nickel foam of density ranging from about 300-500 $g/m^2$ is used. An even more preferred range is between about 350-500 $g/m^2$. In a particularly preferred embodiment nickel foam of density of about 350 $g/m^2$ is used. As the width of the electrode layer is decreased, the foam may be made less dense to ensure there is sufficient void space. In a preferred embodiment, a nickel foam density of about 350 $g/m^2$ and thickness ranging from about 16-18 mils is used.

The Separator

A separator serves to mechanically isolate the positive and negative electrodes, while allowing ionic exchange to occur between the electrodes and the electrolyte. The separator also blocks zinc dendrite formation. Dendrites are crystalline structures having a skeletal or tree-like growth pattern ("dendritic growth") in metal deposition. In practice, dendrites form in the conductive media of a power cell during the lifetime of the cell and effectively bridge the negative and positive electrodes causing shorts and subsequent loss of battery function.

Typically, a separator will have small pores. In certain embodiments described herein, the separator includes multiple layers. The pores and/or laminate structure may provide a tortuous path for zinc dendrites and therefore effectively bar penetration and shorting by dendrites. Preferably, the porous separator has a tortuosity of between about 1.5 and 10, more preferably between about 2 and 5. The average pore diameter is preferably at most about 0.2 microns, and more preferably between about 0.02 and 0.1 microns. Also, the pore size is preferably fairly uniform in the separator. In a specific embodiment, the separator has a porosity of between about 35 and 55% with one preferred material having 45% porosity and a pore size of 0.1 micron.

In a preferred embodiment, the separator comprises at least two layers (and preferably exactly two layers)—a barrier layer to block zinc penetration and a wetting layer to keep the cell wet with electrolyte, allowing ionic exchange. This is generally not the case with nickel cadmium cells, which employ only a single separator material between adjacent electrode layers.

Performance of the cell may be aided by keeping the positive electrode as wet as possible and the negative electrode relatively dry. Thus, in some embodiments, the barrier layer is located adjacent to the negative electrode and the wetting layer is located adjacent to the positive electrode. This arrangement improves performance of the cell by maintaining electrolyte in intimate contact with the positive electrode.

In other embodiments, the wetting layer is placed adjacent to the negative electrode and the barrier layer is placed adjacent to the positive electrode. This arrangement aids recombination of oxygen at the negative electrode by facilitating oxygen transport to the negative electrode via the electrolyte.

The barrier layer is typically a microporous membrane. Any microporous membrane that is ionically conductive may be used. Often a polyolefin having a porosity of between about 30 and 80 percent, and an average pore size of between about 0.005 and 0.3 micron will be suitable. In a preferred embodiment, the barrier layer is a microporous polypropylene. Examples of commercially available materials for the barrier layer include the UBE U-PORE UP3138 (Ube Industries, Ltd., Tokyo, Japan), the SOLUPORE™ products from Solutech of Heerlen, Netherlands, the CELGARD™ line of separators from Celgard Inc. of Charlotte, N.C., and AMS products from Advanced Membrane Systems. The barrier layer is typically about 0.5-4 mils thick, more preferably between about 1.5 and 4 mils thick. Specific examples of barrier layer membranes include a 4 mil AMS separator, a single 2 mil thick UBE separator, 2 layers of a 1 mil thick SOLUPORE™ separator and 2 layers of 1 mil thick CELGARD™ separator.

The wetting layer may be made of any suitable wettable separator material. Typically the wetting layer has a relatively high porosity e.g., between about 50 and 85% porosity. Examples include polyamide materials such as nylon-based as well as wettable polyethylene and polypropylene materials. In certain embodiments, the wetting layer is between about 1 and 10 mils thick, more preferably between about 3 and 6 mils thick. Examples of separate materials that may be employed as the wetting material include NKK VL100 (NKK Corporation, Tokyo, Japan), Freudenberg FS2213E, Scimat 650/45 (SciMAT Limited, Swindon, UK), and Vilene FV4365.

Other separator materials known in the art may be employed. As indicated, nylon-based materials and microporous polyolefins (e.g., polyethylenes and polypropylenes) are very often suitable.

In an alternate embodiment, a single separator material may be used to block zinc penetration and to keep the cell wet with electrolyte. The single separator material may be a separator used in a conventional lithium ion cell but modified for use in the nickel zinc cell. For example, the lithium ion-type separator may be impregnated with a gel to improve its wetability characteristics. One such example is the polyethylene Teklon material available from Entek Membranes LLC, Lebanon, Oreg. This material is 20 microns thick with approximately 40% porosity. Gel may be provided to the separator directly or indirectly by, for example, be adding it to the zinc electrode. Gel electrolytes are employed in some embodiments as explained below.

In certain embodiments, the separator may be treated with a surfactant prior to incorporating into the anode/cathode structure. This serves to enhance the wetability and promote uniform current density. In a specific example, the separator is first treated with a solution of about 0.5-5% of a surfactant such as a Triton surfactant (e.g., X100) available from Dow Chemical Corporation of Midland Mich. The time of contact with the surfactant as well as the drying time, choice of surfactant, and concentration of surfactant are all factors that can impact the effectiveness of the treatment. Soaking for several hours in a dilute aqueous solution and subsequent air-drying can produce excellent results; additionally the use of other solvents such as methanol has been found to accelerate the uptake of the surfactant.

Another approach to rendering the micro-porous polypropylene wettable is to radiation graft specific hydrophilic chemical groups onto the surface of the polymer. One such approach is used by Shanghai Shilong Hi-Tech Co. Ltd, Shanghai Institute of Applied Physics, Chinese Academy of Sciences. In this case the activation process is achieved using cobalt 60 irradiators.

Another consideration in the electrode/separator design is whether to provide the separator as simple sheets of approximately the same width as the electrode and currently collector sheet (e.g., FIG. 2) or to encase one or both electrodes in separator layers. In the latter example, the separator serves as a "bag" for one of the electrode sheets, effectively encapsulating an electrode layer. In some embodiments, encapsulating the negative electrode in a separator layer will aid in preventing dendrite formation. In other embodiments, however, use of a barrier layer sheet without encapsulating an electrode is sufficient protection against dendrite penetration.

The Electrolyte

The electrolyte should possess a composition that limits dendrite formation and other forms of material redistribution in the zinc electrode. Such electrolytes have generally eluded the art. But one that appears to meet the criterion is described in U.S. Pat. No. 5,215,836 issued to M. Eisenberg on Jun. 1, 1993, which is hereby incorporated by reference. A particularly preferred electrolyte includes (1) an alkali or earth alkali hydroxide present in an amount to produce a stoichiometric excess of hydroxide to acid in the range of about 2.5 to 11 equivalents per liter, (2) a soluble alkali or earth alkali fluoride in an amount corresponding to a concentration range of about 0.01 to 1 equivalents per liter of total solution, and (3) a borate, arsenate, and/or phosphate salt (e.g., potassium borate, potassium metaborate, sodium borate, sodium metaborate, and/or a sodium or potassium phosphate). In one specific embodiment, the electrolyte comprises about 4.5 to 10 equiv/liter of potassium hydroxide, from about 2 to 6 equiv/liter boric acid or sodium metaborate and from about 0.01 to 1 equivalents of potassium fluoride. A specific preferred electrolyte for high rate applications comprises about 8.5 equiv/liter of hydroxide, about 4.5 equivalents of boric acid and about 0.2 equivalents of potassium fluoride.

The invention is not limited to the electrolyte compositions presented in the Eisenberg patent. Generally, any electrolyte composition meeting the criteria specified for the applications of interest will suffice. Assuming that high power applications are desired, then the electrolyte should have very good conductivity. Assuming that long cycle life is desired, then the electrolyte should resist dendrite formation. In the present invention, the use of borate and/or fluoride containing KOH electrolyte along with appropriate separator layers reduces the formation of dendrites thus achieving a more robust and long-lived power cell.

In a specific embodiment, the electrolyte composition includes an excess of between about 3 and 5 equiv/liter hydroxide (e.g., KOH, NaOH, and/or LiOH). This assumes that the negative electrode is a zinc oxide based electrode. For calcium zincate negative electrodes, alternate electrolyte formulations may be appropriate. In one example, an appropriate electrolyte for calcium zincate has the following composition: about 15 to 25% by weight KOH, about 0.5 to 5.0% by weight LiOH.

According to various embodiments, the electrolyte may comprise a liquid and a gel. The gel electrolyte may comprise a thickening agent such as CARBOPOL® available from Noveon of Cleveland, Ohio. In a preferred embodiment, a fraction of the active electrolyte material is in gel form. In a specific embodiment, about 5-25% by weight of the electrolyte is provided as gel and the gel component comprises about 1-2% by weight CARBOPOL®.

In some cases, the electrolyte may contain a relatively high concentration of phosphate ion as discussed in U.S. patent application Ser. No. 11/346,861, filed Feb. 1, 2006 and incorporated herein by reference for all purposes.

Polarity

Note that the embodiment shown in FIGS. 1A and 1B has a polarity reverse of that in a conventional NiCd cell, in that the cap is negative and the can is positive. In conventional power cells, the polarity of the cell is such that the cap is positive and the can or vessel is negative. That is, the positive electrode of the cell assembly is electrically connected with the cap and the negative electrode of the cell assembly is electrically connected with the can that retains the cell assembly. In a certain embodiments of this invention, including that depicted in FIGS. 1A and 1B, the polarity of the cell is opposite of that of a conventional cell. Thus, the negative electrode is electrically connected with the cap and the positive electrode is electrically connected to the can. It should be understood that in certain embodiments of this invention, the polarity remains the same as in conventional designs—with a positive cap.

Cell Can

The can is the vessel serving as the outer housing or casing of the final cell. In conventional nickel-cadmium cells, where the can is the negative terminal, it is typically nickel-plated steel. As indicated, in this invention the can may be either the negative or positive terminal. In embodiments in which the can is negative, the can material may be of a composition similar to that employed in a conventional nickel cadmium battery, such as steel, as long as the material is coated with another material compatible with the potential of the zinc electrode. For example, a negative can may be coated with a material such as copper to prevent corrosion. In embodiments where the can is positive and the cap negative, the can may be a composition similar to that used in convention nickel-cadmium cells, typically nickel-plated steel.

In some embodiments, the interior of the can may be coated with a material to aid hydrogen recombination. Any material that catalyzes hydrogen recombination may be used. An example of such a material is silver oxide.

Venting Cap

Although the cell is generally sealed from the environment, the cell may be permitted to vent gases from the battery that are generated during charge and discharge. A typical nickel cadmium cell vents gas at pressures of approximately 200 Pounds per Square Inch (PSI). In some embodiments, a nickel zinc cell of this invention is designed to operate at this pressure and even higher (e.g., up to about 300 PSI) without the need to vent. This may encourage recombination of any oxygen and hydrogen generated within the cell. In certain embodiments, the cell is constructed to maintain an internal pressure of up to about 450 PSI and or even up to about 600 PSI. In other embodiments, a nickel zinc cell is designed to vent gas at relatively lower pressures. This may be appropriate when the design encourages controlled release of hydrogen and/or oxygen gases without their recombination within the cell.

Figure 2:
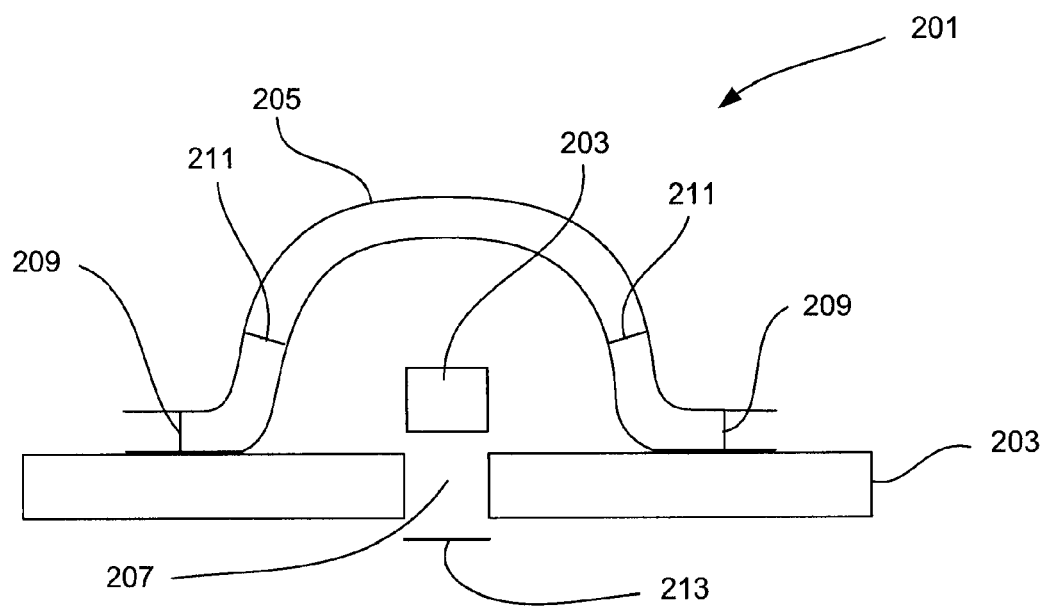
FIG. 2 is a graphical representation of a vent cap.

FIG. 2 is a representation of a cap 201 and vent mechanism. The vent mechanism is preferably designed to allow gas but not electrolyte to escape. Cap 201 includes a disk 208 that rests on the gasket, a vent 203 and an upper portion 205 of cap 201. Disk 208 includes a hole 207 that permits gas to escape. Vent 203 covers hole 207 and is displaced by escaping gas. Vent 203 is typically rubber, though it may be made of any material that permits gas to escape and withstands high temperatures. A square vent has been found to work well. Upper portion 205 is welded to disk 208 at weld spots 209 and includes holes 211 to allow the gas to escape. The locations of weld spots 209 and 211 shown are purely illustrative and these may be at any suitable location. In a preferred embodiment, the vent mechanism includes a vent cover 213 made of a hydrophobic gas permeable membrane. Examples of vent cover materials include microporous polypropylene, microporous polyethylene, microporous PTFE, microporous FEP, microporous fluoropolymers, and mixtures and co-polymers thereof (see e.g., U.S. Pat. No. 6,949,310 (J. Phillips), "Leak Proof Pressure Relief Valve for Secondary Batteries," issued Sep. 27, 2005, which is incorporated herein by reference for all purposes). The material should be able to withstand high temperatures.

In certain embodiments, hydrophobic gas permeable membranes are used in conjunction with a tortuous gas escape route. Other battery venting mechanisms are known in the art and are suitable for use with this invention. In certain embodiments, a cell's materials of construction are chosen to provide regions of hydrogen egress. For example, the cells cap or gasket may be made from a hydrogen permeable polymeric material. In one specific example, the outer annular region of the cell's cap is made from a hydrogen permeable material such as an acrylic plastic or one or more of the polymers listed above. In such embodiments, only the actual terminal (provided in the center of the cap and surrounded by the hydrogen permeable material) need be electrically conductive.

Discharge Rates

A discharge rate may be defined as a current density, e.g., amperes/per zinc electrode surface area. A high discharge rate may be at least about 0.01 Amperes per $cm^2$ of zinc electrode surface area (e.g., typical discharge rates of about 0.01 to 0.4 Amperes/$cm^2$). These should be contrasted with cells employed in "low rate" and "medium rate" applications, which typically require discharging at an average rate of about 0.001 to 0.01 Amperes/$cm^2$. Examples of low rate discharge applications include some consumer electronics applications and load leveling for power companies. In a specific example of a high rate discharge, a 1.5 Amp-hour nickel-zinc cell discharges at a rate of at least about 10 Amps, e.g., between about 10 and 60 Amps.

Other measures of discharge rate are commonly used. For example, the "C" value of a battery cell represents a discharge rate at which the rated capacity of the cell is fully discharged in one hour. Obviously, this measure depends on the rated capacity of the cell. For sub-C cell format nickel-zinc batteries having a rated capacity of 2 Ah, a high rate application might discharge the cell at 20 A or 10 C. A low rate or medium rate discharge may be characterized as about 1-3 C.

It should be understood that a given discharge of a cell may employ multiple high rate events, some of greater magnitude than others. Batteries may be designed for maximum discharge rate; e.g., about 20 Amps for a sub-C cell that might correspond to operation of a circular saw. However, such battery might then be placed in a drill or reciprocating saw, which discharges at a lower rate; e.g., about 10 Amps and then placed in a circular saw and discharged at 20 Amps. All this may take place over the course of a single discharge cycle from a fully charged to a fully discharged state. Thus, it should be understood that when low and medium discharge rates and applications are described herein this does not necessarily imply that a low or medium discharge rate be maintained over the full course of discharge.

Certain embodiments of this invention employ zinc current collectors in nickel zinc cells deployed in low and medium rate applications such as lawn tools and consumer electronics products, etc. Other embodiments of this invention employ zinc current collectors in nickel zinc cells deployed in high rate applications, e.g., circular saws. Of course, it should be understood that embodiments of this invention may be used in mixed rate applications, e.g. medium to high such as using a battery in a lawn tool and then a circular saw within the same charge cycle.

The Electrodes-Separator Sandwich Structure

Figure 3A:
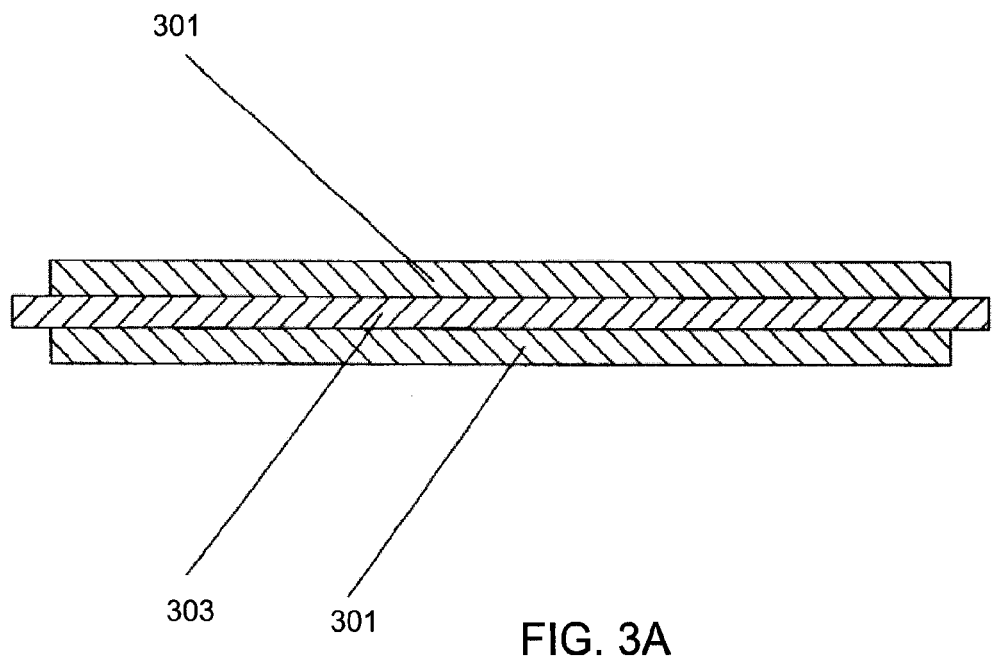
FIGS. 3A and 3B is a graphical representation of various layers in an electrodes-separator sandwich structure.
Figure 3B:
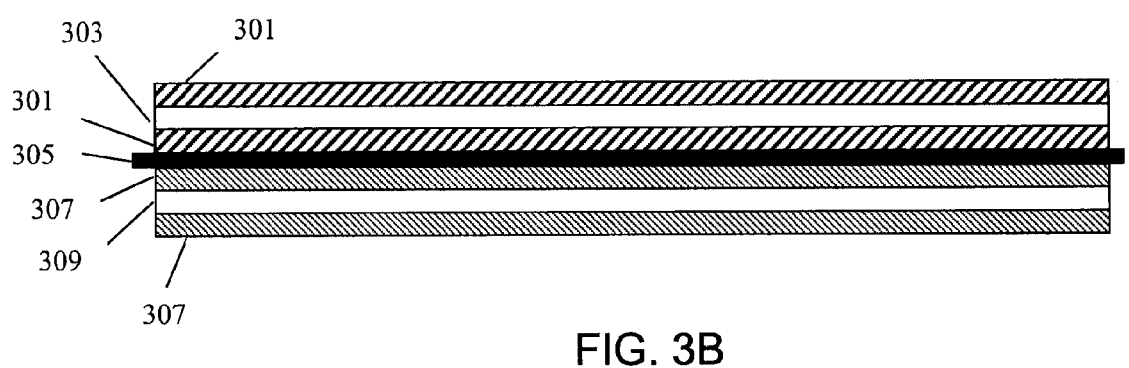

FIG. 3A illustrate the layers of a negative electrode. The negative electrode includes electrochemically active layers 301 and a current collector 303. As shown, the electrochemically active layers 301 are adhered to two sides of the current collector 303. In certain embodiments, the active layers 301 may be on only one side of the current collector 303. FIG. 3B illustrates the various layers in the negative electrode-separator-positive electrode sandwich structure before it is wound. The separator 305 mechanically separates the negative electrode (components 301 and 303) from the positive electrode (components 307 and 309) while allowing ionic exchange to occur between the electrodes and the electrolyte. The electrochemically active layers 301 of the zinc negative electrode typically include zinc oxide and/or zinc metal as the electrochemically active material. The layer 301 may also include other additives or electrochemically active compounds such as calcium zincate, bismuth oxide, aluminum oxide, indium oxide, hydroxyethyl cellulose, and a dispersant.

The current collector 303 should be electrochemically compatible with the negative electrode materials 301. As described above, the current collector may have the structure of a perforated metal sheet, an expanded metal, a metal foam, or a patterned continuous metal sheet.

Opposite from the negative electrode on the other side of the separator 305 is the positive electrode. The positive electrode also includes electrochemically active layers 307 and a current collector 309. The layers 307 of the positive electrode may include nickel hydroxide, nickel oxide, and/or nickel oxyhydroxide as electrochemically active materials. Additives may include zinc oxide and cobalt oxide or cobalt metal. The current collector 309 may be a nickel metal foam matrix or nickel metal sheets. Note that if a nickel foam matrix is used, then layers 307 would be absorbed in the matrix.

Zinc Metal Based Current Collector

As discussed above, using a zinc metal based current collector has advantages and functionality not previously realized in rechargeable nickel zinc cells. It has been discovered that using a zinc metal based current collector reduces the capacity fade in medium to high discharge rate applications. As discussed above, low and medium rate applications are those between about 1-3 C for sub-C cells, and high rate may be up to 10 C, or up to 20 C. These rate categories may be scaled for other size cells. The reduction in capacity fade as the cell or battery cycles effectively increases the cycle lifetime of the battery. For example, the battery can be charged and discharged more often before its capacity reduces to less than 80% of rated capacity.

Without intending to be bound by this theory, it is believed that the zinc current collector may provide a reservoir of zinc metal to delay the onset of zinc limitation or facilitate a more uniform conversion of the electrochemically active material during discharge and charge. Without the zinc metal on the current collector, the electrochemically active material at the negative electrode may react non-uniformly, causing a reactant concentration differential to build up over time. A zinc limitation is reached when the local zinc in the electrochemically active material is depleted. At lower zinc concentrations, a local current density increases. The higher local current density can generate extra heat leading to greater solubility and mobility of the soluble zincate material that can contribute to a greater degradation of the negative electrode over the charge discharge cycle. With zinc metal on the current collector, additional zinc may be dissolved to increase the local zinc concentration as it depletes, making the reaction more uniform.

Examples of metals that may be used together with zinc in the substrate include copper, tin, lead, indium, steel (e.g., stainless steel), titanium, aluminum, bismuth, silver, alloys of these (e.g., brass), and the like. In certain embodiments, these additional metals may serve as a base/core layer or other separate component of the substrate such that the substrate includes some regions of zinc or zinc alloy and other regions of the other material. In one example, the zinc and other material form separate co-extensive and coplanar layers within the substrate. A zinc coated base metal would be one species of this. An alternative configuration would be a coated zinc substrate such that active zinc may be available if the surface film is dissolved during excessive negative electrode polarization. A multi-layer laminate would be another species. In another example, the additional materials and zinc are not co-extensive over the face of the substrate. For example the two materials may form separate longitudinal strips on the substrate. As indicated, various alloys of the non-zinc materials may also be used. Certain embodiments make use of copper alloys such as brass or bronze. In other embodiments, the non-zinc component of the substrate is made from pure tin or a tin alloy such as a tin-lead alloy.

In certain embodiments, a substrate of homogeneous composition may be used. Such substrate will be made of zinc metal or an alloy of zinc. In one example, nickel-zinc cells employ zinc foil, zinc metal sheet, zinc plate, zinc mesh, or zinc foam as the negative electrode substrate. The zinc foil, plate, or sheet may include a plurality of through-holes to increase binding with the active paste. In other words, the zinc foil may be perforated. In other embodiments, the zinc substrate is continuous, e.g., monolithic. A zinc mesh may be woven, expanded, photo-chemically etched or electroformed. A zinc foam may be a cellular structure consisting of solid zinc containing a large volume fraction of gas-filled pores. A mesh or foam may have a void ratio of about 50-98%.

Zinc alloys may be used for types of current collectors, i.e., homogeneous zinc current collectors and heterogeneous zinc-other metal current collectors. For either type, suitable alloying elements include, for example, one or more of copper, tin, lead, indium, titanium, aluminum, bismuth, silver, and the like. Preferably, the zinc alloy contains at least about 50% zinc, or at least about 75% zinc, or at least about 85% zinc, or at least about 90% zinc, or at least about 95% zinc—all compositions in percent atomic. It has been found that certain alloys of zinc are relatively resistant to participation in zinc electrochemical reactions during discharge and charge. An example alloy is Zn (99.5)/Bi/Pb. Other alloys such as those containing tin and/or indium may be also more resistant to the electrochemical reaction. An example of such an alloy would be Zn (99.5%)/In/Bi.

If the current collector contains a core metal layer coated (fully or partially) with a zinc alloy, such structure may be fabricated using various different techniques. If a conventional cladding process is employed, the cladding material may be a prefabricated zinc alloy having the desired composition. If an electroplating process is employed, the plating bath may employ zinc ions as well as ions of alloying elements such as indium and lead in appropriate proportions as is known to those of skill in the art.

Regardless of the type of zinc-based current collector employed, the resulting current collector structure may have many different physical structures. In certain embodiments, it is provided as a continuous smooth foil. In certain embodiments, it may be perforated. It may be perforated with circles or ovals or rectangles or other geometric shapes. In some cases, its surface may be patterned or roughened to allow for better physical contact with the electrochemically active layer. In certain embodiments, the zinc current collector may be an expanded metal having a thickness of, e.g., about 2-20 mils. In other embodiments, the zinc current collector may be a foam material having a thickness of, e.g., between about 15 and 60 mils.

It should be borne in mind that exposed zinc surface may passivate and form a film of zinc oxide. This passivation film may be a problem where the current collector needs to be electrically connected to other cell components; for example, between the current collector and a collection disk such as in the embodiment depicted in FIG. 1. One way to address this issue is to employ a current collector structure having a non-zinc component that is used to bond with the other cell component(s). For example, a zinc coated core metal may be used as the current collector. Or a non-zinc strip of metal may be affixed to the bonding edge of a current collector. The non-zinc bonding metal may be copper, brass tin, or perhaps steel coated with these materials or other metal which can form a passivation film-free connection to, for example, the collector disk. In one embodiment, a core metal is plated or otherwise coated with zinc metal or zinc metal alloy to form a current collector roll. Subsequently, during the manufacturing process, the current collector roll may be cut into several sections (each serving as the substrate for the negative electrode of a separate cell). The incision edge would expose the core metal so that the metal collector disk may be attached to the exposed core metal. In another embodiment, only a part of the core metal is plated with zinc or zinc-based metal. The unplated part may then be used for electrical connection to the metal tab.

Note that zinc may be coated on a base or core metal of the current collector by any of various means such as plating, dipping in molten metal, laminating, etc. In a specific embodiment, the negative current collector is copper or a copper alloy coated with zinc or a zinc alloy to a thickness of between about 0.0005 and 0.002 inches.

In certain embodiments, a zinc coated metal layer is treated in a manner that causes the zinc and the underlying base metal to interact and form an alloy or mixture of materials at the interface of the base metal and coating. In some cases the treatment will cause the coating to be completely consumed otherwise integrated into the base metal. In other cases, the base metal will be completely integrated into the coating. In still other cases, at least some of the base metal will remain intact as will some of the coating material. For example, a cross-section of such substrate may include a base metal core, an alloy directly around the base metal, and a zinc coating material outside the alloy. The coating material will be present an outer surface of the current collection substrate. In a specific embodiment, the interior base metal is copper or brass, the intermediate alloy is a zinc-copper alloy (e.g., a high zinc content brass) and the coating material is zinc or a zinc alloy.

In some cases, the intermediate alloy or mixture has a graded composition profile. If the base metal is copper, for example, the composition may vary from a relatively high zinc content brass near the coating to a relatively high copper content brass near the base metal.

The treatment that forms an alloy or graded composition at the edge of a base metal may be a heating or annealing process (e.g., exposure to thermal energy at a defined temperature for a set period of time). Other processes that may be employed include ion implantation treatments, plasma treatments, and the like. Such processes may be employed alone or in combination with one another, or in combination with a heating step.

In some embodiments, zinc or zinc-based metal may be added to a core metal by a cladding process. Again the zinc or zinc-based metal may not cover the entire core metal sheet. The exposed portion may then be used for electrical connection. In some instances, only a small amount of zinc may be used. The zinc plating or cladding material may be as much as 25-50% of the entire thickness of the current collector.

Using a zinc or zinc metal plated or clad current collector is also a guard against the difficulties resulting from zinc participating in the electrochemical reaction. In the case where the zinc plated or clad on the current collector slowly dissolves through the electrochemical reaction, the core metal will remain to conduct current and the battery does not die.

It is believed that using zinc on the current collector may increase battery life by as much as 50-100%. In other words, if, on average, nickel zinc cells employing copper current collectors were observed to cycle 200 time before their capacity faded to below 80% of the rated capacity, otherwise identical cells employing zinc current collectors would be observed to cycle as much 400 times, on average and under the same cycling conditions, before their capacity faded to below 80%. In accordance with aspects of this invention, sub-C cylindrical nickel zinc cells having a construction as depicted generally in FIG. 1 and employing zinc current collectors will cycle at least about 300 times before their capacity decreases below 80% of their initial rated capacity when discharged at 1 C.

The cycle life of the cell may be influenced by the ratio of the electronic conductivity of the electrode to the ionic conductivity of the electrolyte. Improved negative electrode conductivity promotes the utilization of the zinc away from the current collector. One example of a suitable high conductivity negative electrode composition by weight is approximately 12% zinc alloy, 5-10% bismuth oxide, and 81-76% zinc oxide. The remaining materials consist of binders and small percentages of anti-corrosion additives.

EXAMPLE AND DATA

Two sets of experiments were conducted. In both sets, batteries were constructed using current collection substrates in accordance with an embodiment of the present invention and compared with batteries constructed using current collectors of copper or brass. The batteries were subjected to various tests. In every case, the batteries were charged and discharged over many cycles and its capacity after a full charge was measured and plotted.

In the first set, batteries were subjected to charge/discharge in the high rate regime. As noted before, high rate discharge may be up to 10 C (or 20 Amps for a 2 Ah battery). In this test, batteries were charged discharged at 12 A.

The batteries in the first experiment set were constructed with perforated zinc metal plates as the current collector having various purities. Particularly, perforated zinc plates with 98.5%, 98.7%, 99.5% and 99.95% atomic zinc were made and tested. The negative electrode was constructed using an electrochemically active layer having zinc oxide 50%, calcium zincate 20%, barium oxide 3.0%, bismuth oxide 1.5%, indium oxide 1.0%, lead oxide 1.5%, zinc 3.0%, cadmium 1.0%, and small amounts of water-based binder. The current collector was made from zinc ingots by rolling them. The zinc ingots were in compliance with China National Standard GB/T 470-1997 or International Standard ISO 752-1981 (E). Five batches of batteries were made. They included current collectors of copper (control group) and current collectors zinc metal at 98.5%, 98.7%, 99.5% and 99.95% atomic zinc. Ten batteries out of each batch were tested.

For each battery, the initial capacity after an initial charge was measured. Then the battery was discharged at 12 A and recharged fully. The capacity after each recharge was measured and plotted. The table below includes average capacity data after 80, 160, 240, and 300 cycles for each batch.

TABLE 1

Figure 4:
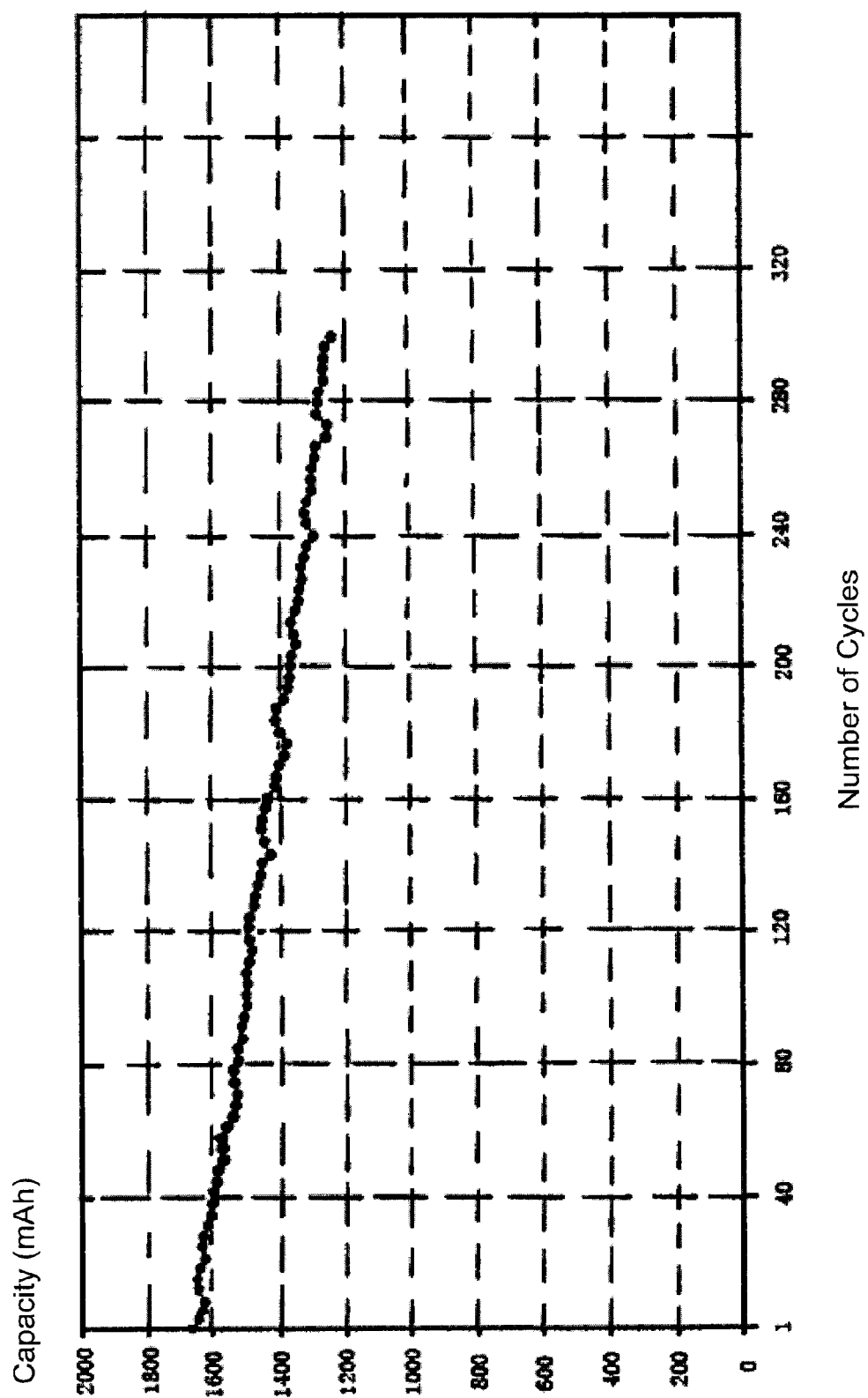
FIG. 4 is a graph illustrating capacity over cell life in cycles of a zinc-nickel battery using a copper strip as its negative substrate current collector.
Figure 5:
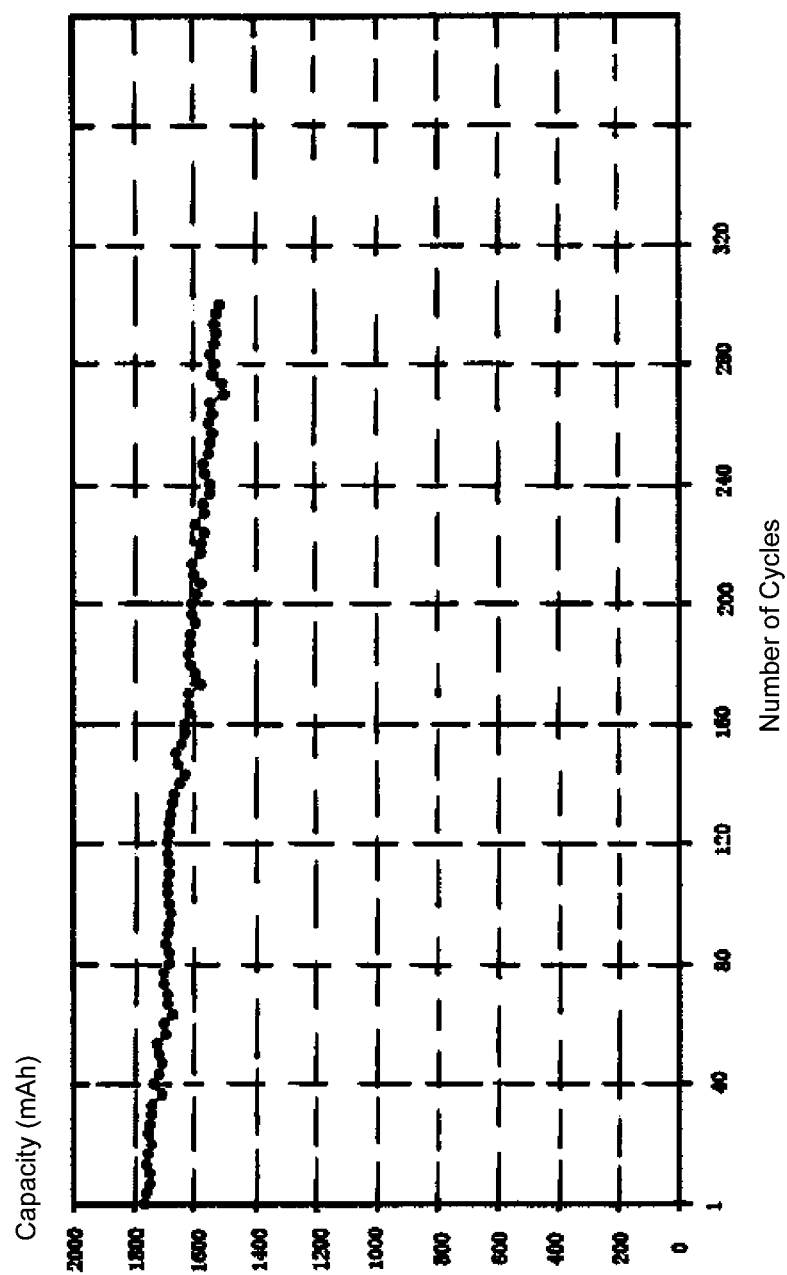
FIG. 5 is a graph illustrating capacity over cell life in cycles of a zinc-nickel battery using a zinc strip having 98.5% atomic zinc as its negative substrate current collector.
Figure 6:
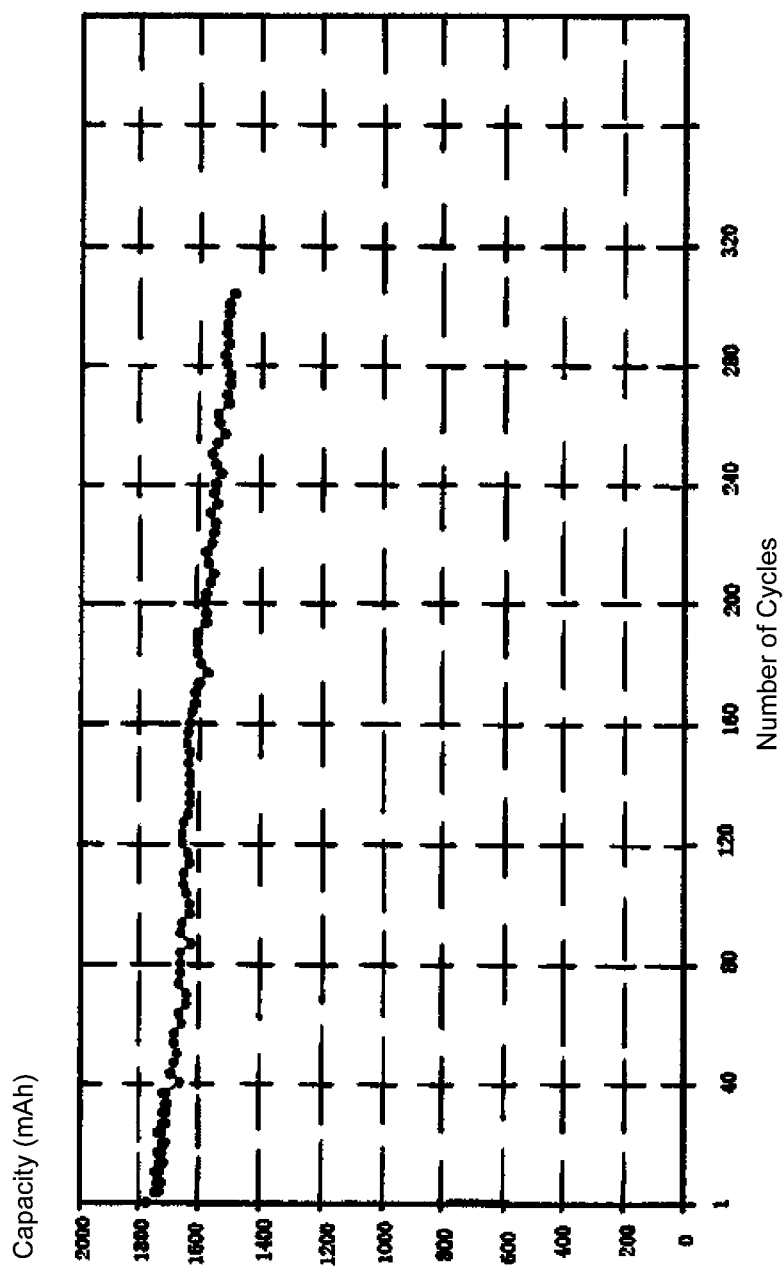
FIG. 6 is a graph illustrating capacity over cell life in cycles of a zinc-nickel battery using a zinc strip having 98.7% atomic zinc as its negative substrate current collector.
Figure 7:
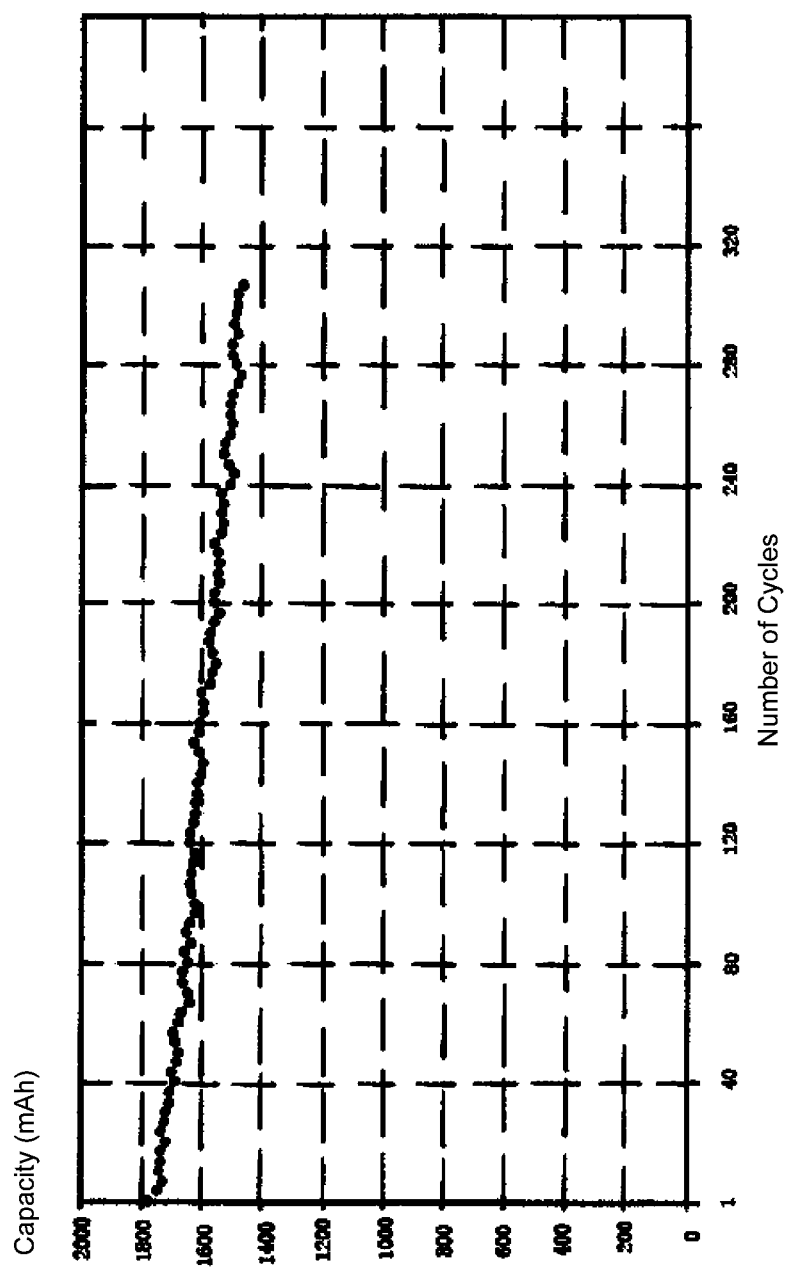
FIG. 7 is a graph illustrating capacity over cell life in cycles of a zinc-nickel battery using zinc strip having 99.5% atomic zinc as its negative substrate current collector.
Figure 8:
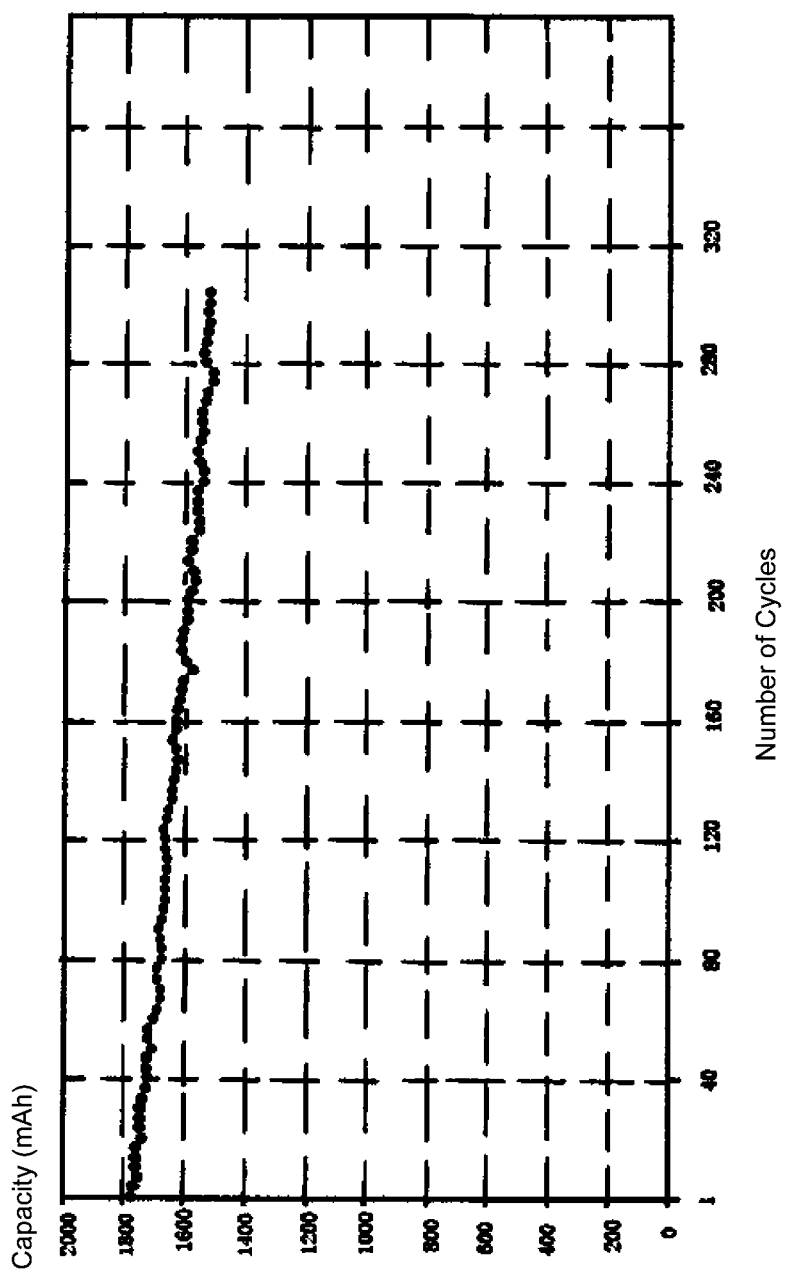
FIG. 8 is a graph illustrating capacity over cell life in cycles of a zinc-nickel battery using a zinc strip having 99.95% atomic zinc as its negative substrate current collector.

| Current collection substrate type | Initial capacity (mAh) | Capacity after 80 cycles (mAh) | Capacity after 160 cycles (mAh) | Capacity after 240 cycles (mAh) | Capacity after 300 cycles (mAh) | Data plot |
|---|---|---|---|---|---|---|
| Copper (control) | 1650 | 1520 | 1420 | 1300 | 1220 | FIG. 4 |
| Ratio in relative to the initial capacity | | 92.1% | 86.1% | 78.9% | 73.9% | |
| 98.5% zinc | 1780 | 1680 | 1600 | 1500 | 1500 | FIG. 5 |
| Ratio in relative to the initial capacity | | 94.4% | 89.9% | 84.3% | 84.3% | |
| 98.7% zinc | 1770 | 1690 | 1610 | 1570 | 1560 | FIG. 6 |
| Ratio in relative to the initial capacity | | 95.5% | 91.0% | 88.7% | 88.1% | |
| 99.5% zinc | 1780 | 1700 | 1620 | 1580 | 1570 | FIG. 7 |
| Ratio in relative to the initial capacity | | 95.5% | 91.0% | 88.8% | 88.2% | |
| 99.95% zinc | 1780 | 1680 | 1620 | 1580 | 1580 | FIG. 8 |
| Ratio in relative to the initial capacity | | 94.4% | 91.0% | 88.8% | 88.8% | |

Comparing the results shown in Table 1 and the respective FIGS. 4 to 8, it can be seen that zinc-nickel batteries made from the current collection substrate with the zinc content of greater than or equal to 98.5% all have an initial capacity of above 1770 mAh, which is greater than the initial capacity of the control sample, i.e. 1650 mAh; and that the capacities after 80 cycles, 160 cycles, 240 cycles and 300 cycles of these zinc-nickel batteries were respectively higher than the control sample. Another notable trend is the increased performance with increased zinc contents in the substrates. As the zinc concentration increases, the capacities at all cycles, from the initial cycle to cycle number 300 all increase. In addition, the percent of capacity decrease over cycle lifetimes, is reduced. As noted above, some capacity decrease is expected over cycle lifetime, and a battery is considered dead when the capacity becomes 80% of the rated capacity. Although the initial capacity is not necessarily the same as rated capacity, the ratio of capacity relative to the initial capacity gives some indication of the useful cycle lifetime of a battery cell. At cycle number 300, the ratio increases as the zinc concentration increases. Thus, batteries made with current collection substrate having higher zinc concentrations are more likely to last longer as to number of cycles. A reasonable extrapolation from the data in Table 1 and FIGS. 4 to 8 suggests that even higher zinc concentrations can yield batteries with even better performance. For example, excellent battery performance is expected at current collector zinc concentrations of 99.99% and 99.995%.

Figure 9:
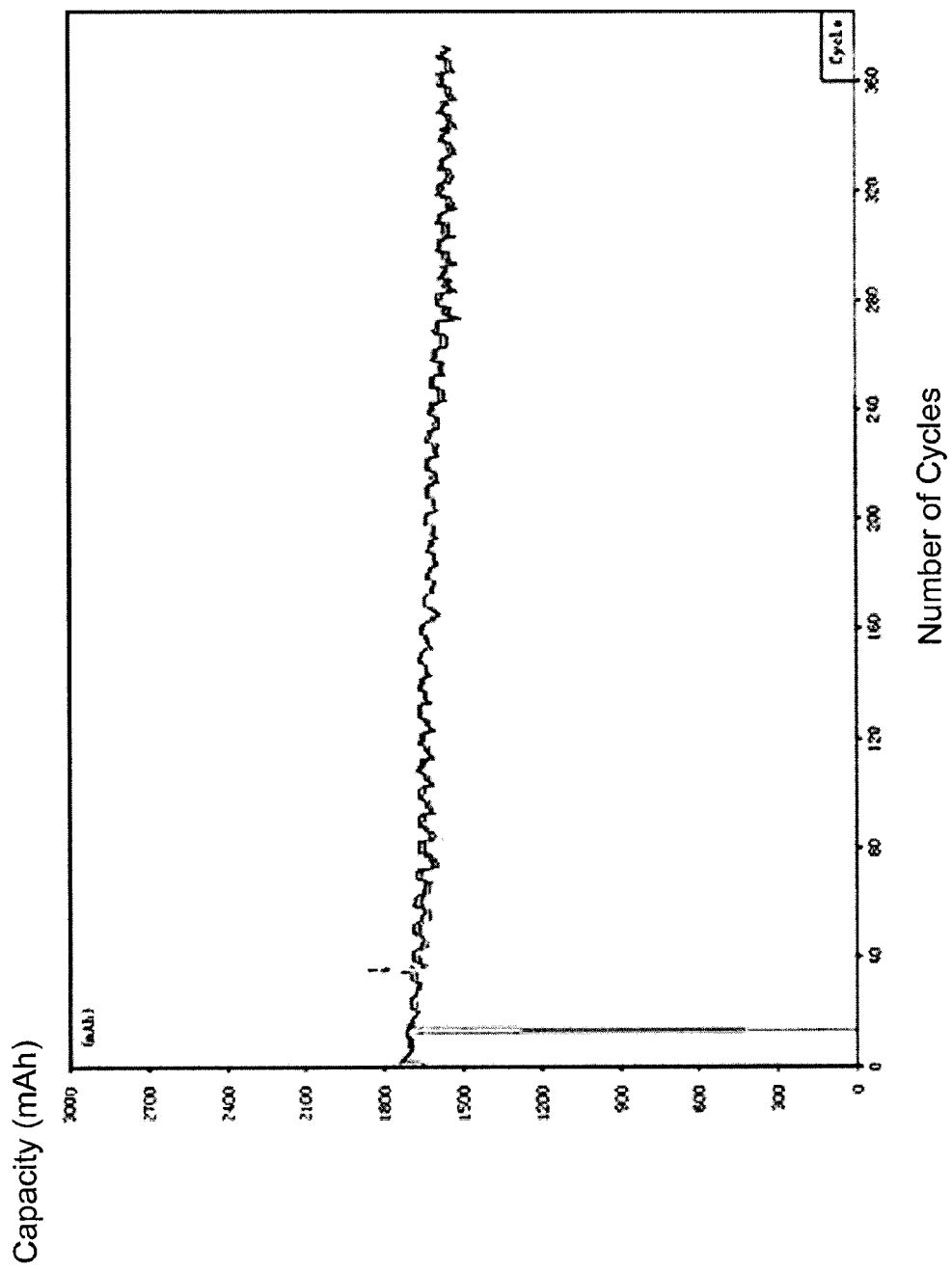
FIG. 9 is a graph illustrating capacity over cell life in cycles of a zinc-nickel battery using a perforated zinc foil with less than 0.5% impurities as its negative substrate current collector.

In a second set of experiments, batteries constructed with a current collection substrate made using various zinc-based current collection substrates were charged and discharged. The discharge current in this second set of experiments was varied between 1.6 and 6 A, which is in the medium rate discharge regime for these batteries. FIG. 9 represents the cycling behavior of two $C_s$ (sub-C) nickel-zinc electrochemical cells that over 350 cycles. The negative electrode substrate was a perforated zinc foil with less than 0.5% impurities. The discharge current was varied between 1.6 and 6 A. Charging was accomplished using a constant current/constant voltage regime to a maximum voltage of 1.9V, or 100%. After 350 cycles the retained capacity was 90% of the original.

Figure 10:
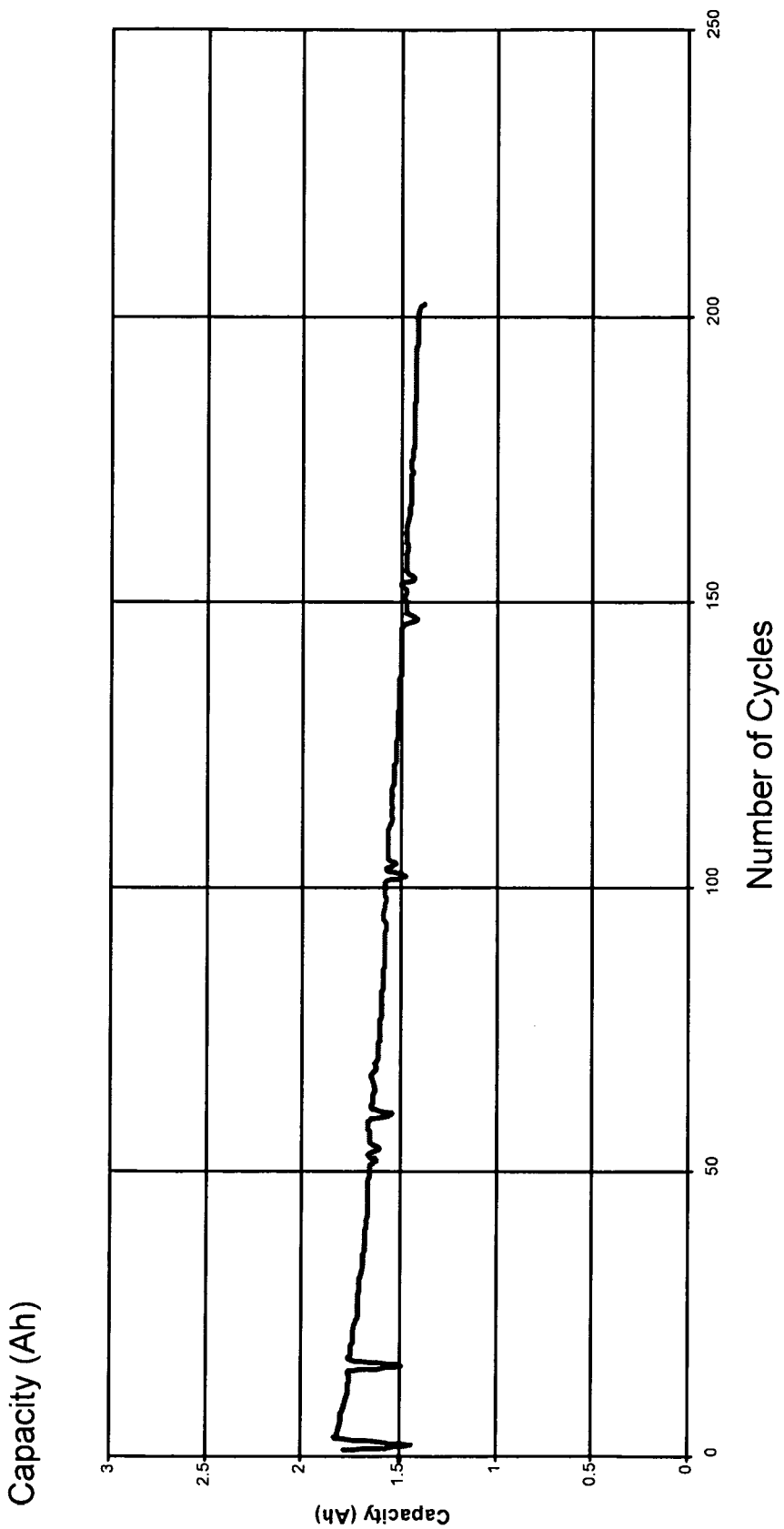
FIG. 10 is a graph illustrating capacity over cell life in cycles of a zinc-nickel battery using a perforated zinc foil coated with zinc/indium as its negative substrate current collector.

FIG. 10 is another cycling behavior plot. The discharge current was also varied between 1.6 and 6 A and the charging of the cell was accomplished using a constant current/constant voltage method similar to the first example of FIG. 9. In this case the negative electrode substrate was a 0.003 inch thick perforated copper foil that was coated with a 0.001 inch thick zinc/indium plating. The relevant design parameters were substantially similar to those in the previous example. After 200 cycles the cell delivered approximately 78% of the initial capacity.

Figure 11:
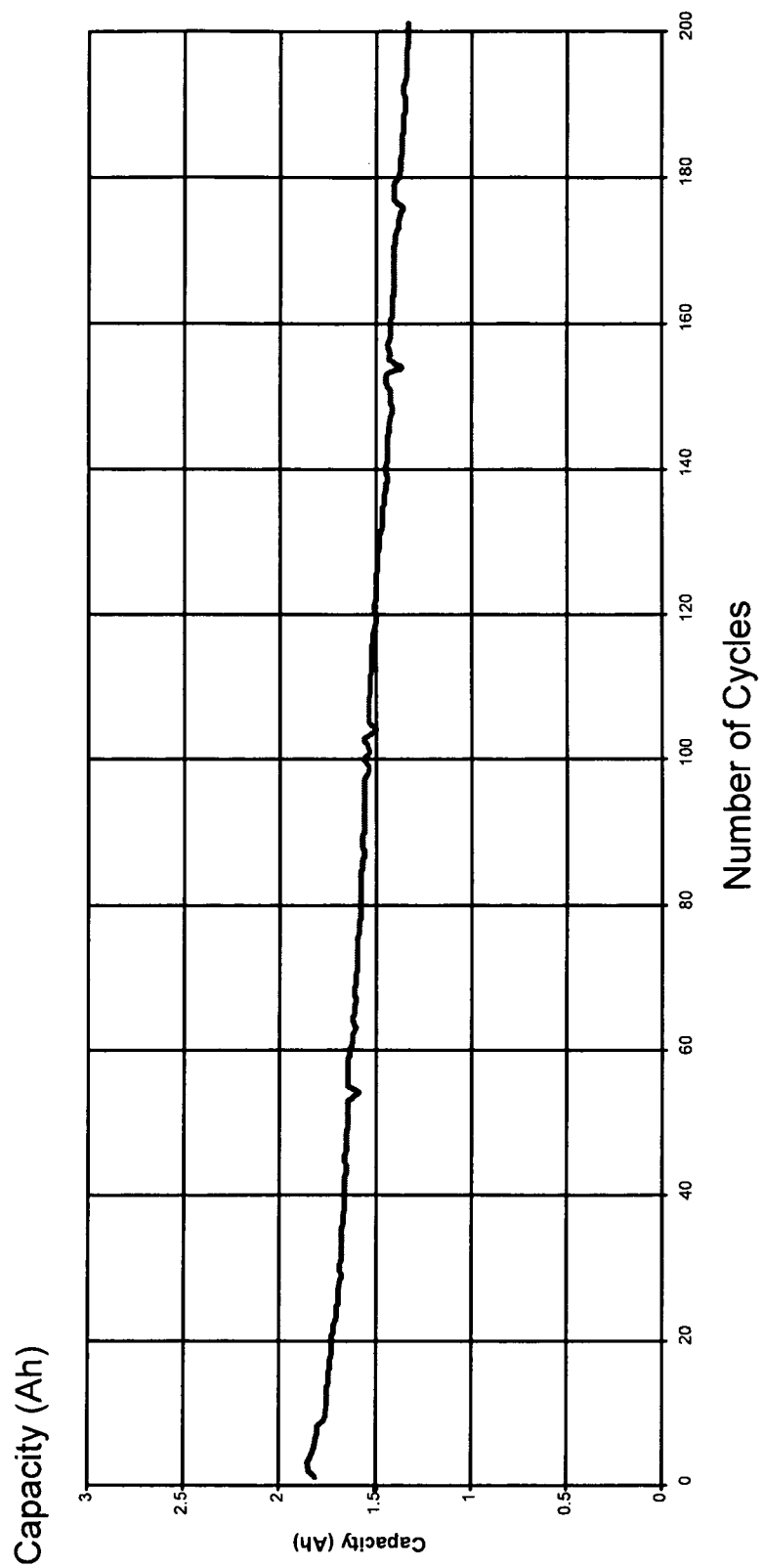
FIG. 11 is a graph illustrating capacity over cell life in cycles of a zinc-nickel battery using a copper foil coated with tin as its negative substrate current collector.

FIG. 11 shows capacity changes of a "control" cell cycled under the same regime as that of FIG. 10. In this case the negative substrate was a perforated tin plated 0.004 inch thick copper foil. The retained capacity over 200 cycles was only 72% of the original capacity. Test cells of FIG. 9 and FIG. 10 with enhanced zinc content on the current collector delivered more energy and retained more capacity over the life of the cell than the control cell of FIG. 11. Comparison of the results for test cell of FIG. 9 and FIG. 10 shows that the perforated high purity zinc foil embodiment performs better than a copper foil coated with zinc/indium.

All test cells were made with pasted zinc negative electrodes having a composition of 80-85% ZnO and 15-20% Zn.

The paste carrier in each case was a perforated material between 0.003-0.004 inch thick. The separator system in all cases was two layers of 25μ microporous membrane and a wicking layer of cellulose and PVA supplied by NKK. The polypropylene microporous membrane was rendered wettable by pre-doping with a non-ionic surfactant. The electrolyte was a mixture of 8.5M potassium, sodium and lithium hydroxide containing 1.2M boric acid and approximately 1.2% of potassium fluoride by weight.

While this invention has been described using nickel zinc batteries as examples, the invention is not so limited. Zinc-based substrate current collectors of this invention may be employed in any of a number of cells employing zinc electrodes. These include, e.g., zinc air cells, silver zinc cells, and zinc manganese dioxide cells.

What is claimed is:

1. A nickel zinc battery cell comprising:
   (a) a negative electrode layer comprising a metallic zinc-based current collection substrate adhering to a zinc oxide based electrochemically active layer, wherein the zinc-based current collection substrate comprises at least a portion comprising at least 95 atomic % zinc that serves as a reservoir of zinc for the zinc oxide based electrochemically active layer during cell operation;
   (b) a positive electrode layer comprising nickel;
   (c) a separator layer to separate the positive and negative electrode layers; and
   (d) an electrolyte;
   wherein the nickel zinc battery cell is a rechargeable cell, and wherein, if the metallic zinc-based current collection substrate is a zinc coated structure with a non-zinc core metal, then the zinc coating is between 25% and 50% of the entire thickness of the zinc-based current collection substrate, and the zinc coating comprises at least 95 atomic % zinc and serves as a reservoir of zinc for the zinc oxide based electrochemically active layer during cell operation.

2. The cell of claim 1 wherein the metallic zinc-based current collection substrate comprises 98.5-99.95% atomic zinc.

3. The cell of claim 1 wherein the metallic zinc-based current collection substrate comprises 95-100% atomic zinc, and 0-5% bismuth and/or lead.

4. The cell of claim 3, wherein the metallic zinc-based current collection substrate comprises a continuous sheet of metal 2-5 mils thick.

5. The cell of claim 1 wherein the metallic zinc-based current collection substrate comprises a continuous sheet of metal, a perforated sheet of metal or an expanded metal.

6. The cell of claim 1, wherein the metallic zinc-based current collection substrate is zinc strip with through holes.

7. The cell of claim 1, wherein the metallic zinc-based current collection substrate is zinc mesh.

8. The cell of claim 1 wherein the metallic zinc-based current collection substrate comprises a first core metal sheet and zinc plating or cladding on all or a portion of the first core metal sheet.

9. The cell of claim 8, wherein the first core metal sheet is steel, copper, tin, or brass.

10. The cell of claim 8, wherein a portion of the first core metal sheet is not plated and is used for electrical contact to a collector disk.

11. The cell of claim 8, wherein the total current collector thickness is 2-6 mils.

12. The cell of claim 1, wherein sheets of the negative electrode, the separator, and the positive electrode are in intimate contact with one another.

13. The cell of claim 12, wherein the sheets of negative electrode, separator, and positive electrode are spirally wound.

14. The cell of claim 13, wherein the cell has an overall cylindrical configuration.

15. The cell of claim 1, wherein the electrolyte is present in a limited quantity so that the cell operates in a starved fashion.

16. The cell of claim 1, wherein the entire zinc-based current collection substrate comprises at least 95 atomic % zinc.

17. The cell of claim 1, wherein the zinc-based current collection substrate comprises at least a portion comprising at least 95 atomic % zinc alloyed with indium and bismuth.

18. The cell of claim 1, wherein if the metallic zinc-based current collection substrate is a zinc coated structure with a non-zinc core metal, the thickness of the current collection substrate is between about 2-10 mils.

19. The cell of claim 1, wherein the portion of the current collection substrate comprising at least 95 atomic % zinc is selected from the group consisting of: a foam having a thickness of about 15-60 mils, an expanded metal having a thickness of about 2-20 mils, and a metallic sheet, plate or foil, wherein the metallic sheet plate or foil has a thickness of about 2-5 mils.

20. A rechargeable negative electrode in a nickel-zinc battery cell, the negative electrode comprising:
   (a) a metallic zinc-based current collection substrate comprising 95-100 atomic % zinc; and
   (b) a negative zinc oxide based electrochemically active layer adhering to the current collection substrate, wherein the current collection substrate serves as a reservoir of zinc for the zinc oxide based electrochemically active layer during cell operation,
   wherein the current collection substrate is a metal zinc plate or a metal zinc mesh.

21. The negative electrode of claim 20, wherein the current collection substrate consists of 98.5 to 99.95% atomic zinc.

22. The negative electrode of claim 20, wherein the current collection substrate is a perforated zinc foil.

23. The negative electrode of claim 20, wherein the metallic zinc-based current collection substrate consists of a zinc alloy, wherein the alloy further comprises indium and bismuth.

* * * * *